INVENTOR.
Hans P. Boswau.
BY
Atty.

INVENTOR.
Hans P. Boswau
BY
Atty.

AUTOMATIC TELEPHONE SYSTEM

Original Filed Dec. 14, 1948 13 Sheets-Sheet 3

INVENTOR.
Hans P. Boswau
BY
Atty.

AUTOMATIC TELEPHONE SYSTEM

Original Filed Dec. 14, 1948

INVENTOR.
Hans P. Boswau
BY
Atty.

Sept. 11, 1956

H. P. BOSWAU 2,762,864

AUTOMATIC TELEPHONE SYSTEM

Original Filed Dec. 14, 1948

13 Sheets-Sheet 5

INVENTOR.
Hans P. Boswau
BY
Atty.

Sept. 11, 1956 H. P. BOSWAU 2,762,864

AUTOMATIC TELEPHONE SYSTEM

Original Filed Dec. 14, 1948 13 Sheets-Sheet 6

INVENTOR.
Hans P. Boswau
BY
Atty.

Sept. 11, 1956 H. P. BOSWAU 2,762,864

AUTOMATIC TELEPHONE SYSTEM

Original Filed Dec. 14, 1948 13 Sheets-Sheet 7

INVENTOR.
Hans P. Boswau.
BY
Atty.

Sept. 11, 1956 H. P. BOSWAU 2,762,864

AUTOMATIC TELEPHONE SYSTEM

Original Filed Dec. 14, 1948 13 Sheets-Sheet 8

INVENTOR.
Hans P. Boswau.
BY
Atty.

INVENTOR.
Hans P. Boswau
BY
Atty.

Sept. 11, 1956 H. P. BOSWAU 2,762,864

AUTOMATIC TELEPHONE SYSTEM

Original Filed Dec. 14, 1948 13 Sheets-Sheet 10

INVENTOR.
Hans P. Boswau.
BY
Atty.

INVENTOR.
Hans P. Boswau
BY
Atty.

INVENTOR.
Hans P. Boswau
BY
[signature]
Atty.

Sept. 11, 1956

H. P. BOSWAU 2,762,864

AUTOMATIC TELEPHONE SYSTEM

Original Filed Dec. 14, 1948

13 Sheets-Sheet 13

| PULSE | COUNTING RELAYS OPERATED |
|---|---|
| 1 | 1 2 3 |
| 2 | 3 4 |
| 3 | 1 2 4 5 |
| 4 | 5 6 |
| 5 | 1 2 3 5 6 |
| 6 | 3 4 5 6 |
| 7 | 1 2 4 6 |
| 8 | 6 |
| 9 | 1 2 3 6 |
| 0 | 3 4 6 |

INVENTOR.
Hans P. Boswau.
BY
[signature]
Atty.

United States Patent Office 2,762,864

Patented Sept. 11, 1956

2,762,864

AUTOMATIC TELEPHONE SYSTEM

Hans P. Boswau, Dundee, Ill., assignor to Leich Electric Company, a corporation of Illinois Original application December 14, 1948, Serial No. 65,268. Divided and this application June 7, 1950, Serial No. 166,624

21 Claims. (Cl. 179—18)

This application is a division of co-pending application Ser. No. 65,218, filed December 14, 1948, now Patent No. 2,573,889, dated November 6, 1951. The invention disclosed herein is concerned with an automatic telephone system and with circuits for use in such system.

The new system employs a switching apparatus as disclosed in the above noted, patent, which may be referred to, for the sake of convenience, as a type of coordinate or crossbar apparatus, or as a type of relay switching apparatus. There are provided a desired number of switches disposed side by side, each having access to a link circuit through the medium of a switch bus having conductors which are multipled to a plurality of sets of "units" contacts. Each set of units contacts is operable by a "units" actuator and is associated with corresponding sets of contact fingers disposed in superposed rows for selective engagement by means of "tens" actuators with sets of removable bare conductor bars. The latter extend serially through all the switches and form the line multiple therefor. The extension of a particular set of conductor bars to a link circuit is accomplished by the selective actuation of a particular "tens" actuator and a particular "units" actuator under control of allotter means which is incorporated in each switch and under control of new tens and units guard means which is associated with the switching apparatus.

Some of the specific objects and features of the invention may be briefly summarized as follows:

1. One object is to provide a system having a switch of the character described comprising tens and units actuators, relay means for operating each actuator, and holding contact means operated by each relay means.

2. Another object is to provide a system having a switch as described, comprising removably mounted conductors forming a line bank multiple representing subscribers' lines each associated with a set of conductors in said line bank multiple, conductors forming a switch bus, tens and units actuators for selectively connecting any of said sets of removable conductors with the conductors of said switch bus, individual magnet means for operating each of said tens and units actuators, removably mounted conductors forming an allotter bank multiple, a separate actuator for said allotter bank multiple, and contact means operated by said separate actuator for connecting said individual magnet means with predetermined conductors of said allotter bank multiple.

3. Another object of the invention is to provide a system having a switch of the class described, which comprises removable sets of conductors forming a line bank multiple, conductors forming a switch bus, tens and units actuators for connecting any set of conductors in said line bank multiple with corresponding conductors of said switch bus, individual magnet means for said tens and units actuators, conductors forming an allotter bank multiple, an allotter actuator, and contact means controlled by said allotter actuator for simultaneously connecting a predetermined tens and a predetermined units magnet to predetermined conductors of said allotter bank multiple.

4. A further object is to provide a system having a switch of the character described, which may be interchangeably operated as a finder or as a connector.

5. Another object is to provide a system having a switching mechanism comprising a plurality of like switches disposed side by side, said switches being arranged in pairs, each pair comprising a finder and a connector.

6. The invention also contemplates as an object to provide a new line lockout circuit comprising a line relay and a cutoff relay associated with a line, circuit means for energizing said relays in series relationship incident to establishing a connection, and means for establishing an auxiliary circuit for holding said cutoff relay momentarily operated upon release of said circuit means and consequent release of said line relay.

7. A further object is to provide a new line circuit as defined in the foregoing paragraph, particularly for use with a party line, wherein said cutoff relay is equipped with two balanced windings, and circuit means operative on reverting calls, upon release of said line relay, for connecting said balanced windings to the line loop for the purpose of feeding transmitter battery thereto.

8. Still another object is to provide a tens and units guard control circuit for a group of lines having the same tens digit in their numbers, said control circuit comprising a line and a cutoff relay for each line in the group, a tens guard and a units guard relay, and contact means governed by said line and said cutoff relay for controlling the operation of said guard relays.

9. Another object is to provide subscribers' lines in tens and units groups, ten tens allotter bars for each tens and ten allotter bars for each units group, a tens and units guard circuit, and means in said guard circuit responsive to the initiation of a call by a subscriber for selecting the tens and the units allotter bars of the corresponding groups and for marking such bars.

10. The invention also proposes to provide a plurality of finder switches, each associated with a link circuit, allotter means included in each finder switch and comprising an allotter magnet, a control circuit including a conductor serially connected to all the link circuit, means for marking said conductor in response to a call initiated by a subscriber, means in an idle link responsive to such marking for causing operation of the allotter magnet associated with the finder of such link, and means operated by said allotter to cause said finder to seize the terminals of said calling line.

11. Another object is to provide allotter means adapted to control the operation of finder switches to seize calling lines, means for seizing said allotter means responsive to the initiation of a call by a line, and relay means for freeing said allotter means if seized by a line having trouble in its line circuit.

12. Still another object is to provide a marker circuit which is comon to all links, permitting the use of finder and connector switches of identical construction.

13. The marker circuit, in accordance with another object, contains the digit wiring, thus simplifying changes which may be desired with the regard to digit designations.

14. In accordance with a further object, the marker determines simultaneous actuation of the tens and units magnets in the connector switch, thereby selecting a trunk in response to a single digit dialled by a calling party.

15. The invention also provides a novel interrupter circuit which comprises a set of relays for controlling the signalling to a calling line, to a pay station or to a trunk, and for driving another set for relays which control the ringing on called lines.

16. The invention further provides, in accordance with still another object, an automatic telephone system furnishing facilities for local calls and for trunk calls to a manual switching point and including a trunk line and a control circuit therefor, giving access to said trunk line, a link circuit for effecting local and trunk calls, respectively, time control disconnect means for causing disconnection of a local call, and means in the trunk control circuit for disabling said disconnect means on trunk calls.

17. In connection with trunk line operation, the invention also provides a control circuit which momentarily reverses battery on trunk calls to start a spurt of tone on pay station lines.

18. As a novel feature, the invention further provides a set of lockout relays actuated by timing impulses delivered at three-minute intervals to an input conductor by a timer, and means operating in conjunction with a capacitor which is effective upon power failure for delivering timing impulses to said input conductor at shortened intervals.

19. As another feature, the invention also provides relay means for the transmission to the links of time disconnect pulses under control of the relays and the timer which govern the transmission of lockout timing impuless.

20. Other features of the invention reside in the use of several relays in the link circuit, each for performing several distinct functions.

21. A novel counting relay circuit is provided using six relays in binary operation in pairs of two for counting ten pulses, thus obtaining ten distinct relay combinations, one for each of ten dial pulses.

22. The use of counting relays for counting dial pulses to furnish information to the marker and the use of some of these counting relays in party line ringing is a further feature of the invention, making it possible to use either bridged metallic or divided grounded ringing on any line.

23. As another feature, there are provided five ringing leads for ten rings in conjunction with two separate ringing start links for code ringing up to ten codes.

The foregoing summary gives only examples of the objects and features of the invention.

The objects noted in the foregoing statements and other objects and features will be described with reference to the accompanying drawings, in which Fig. 1 is a diagrammatic representation of the new switch structure:

Figure 16:
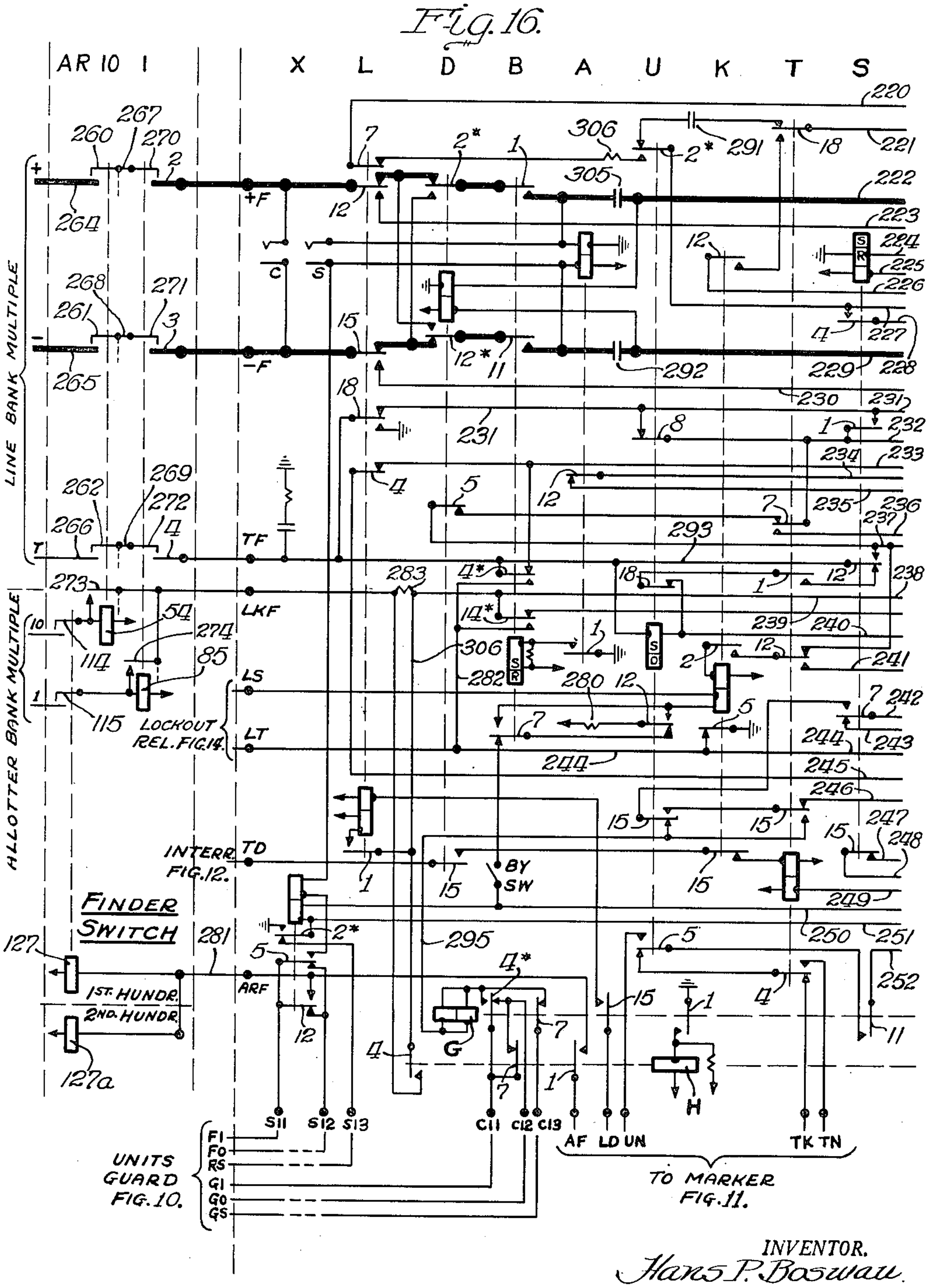
Figures 17, 18:
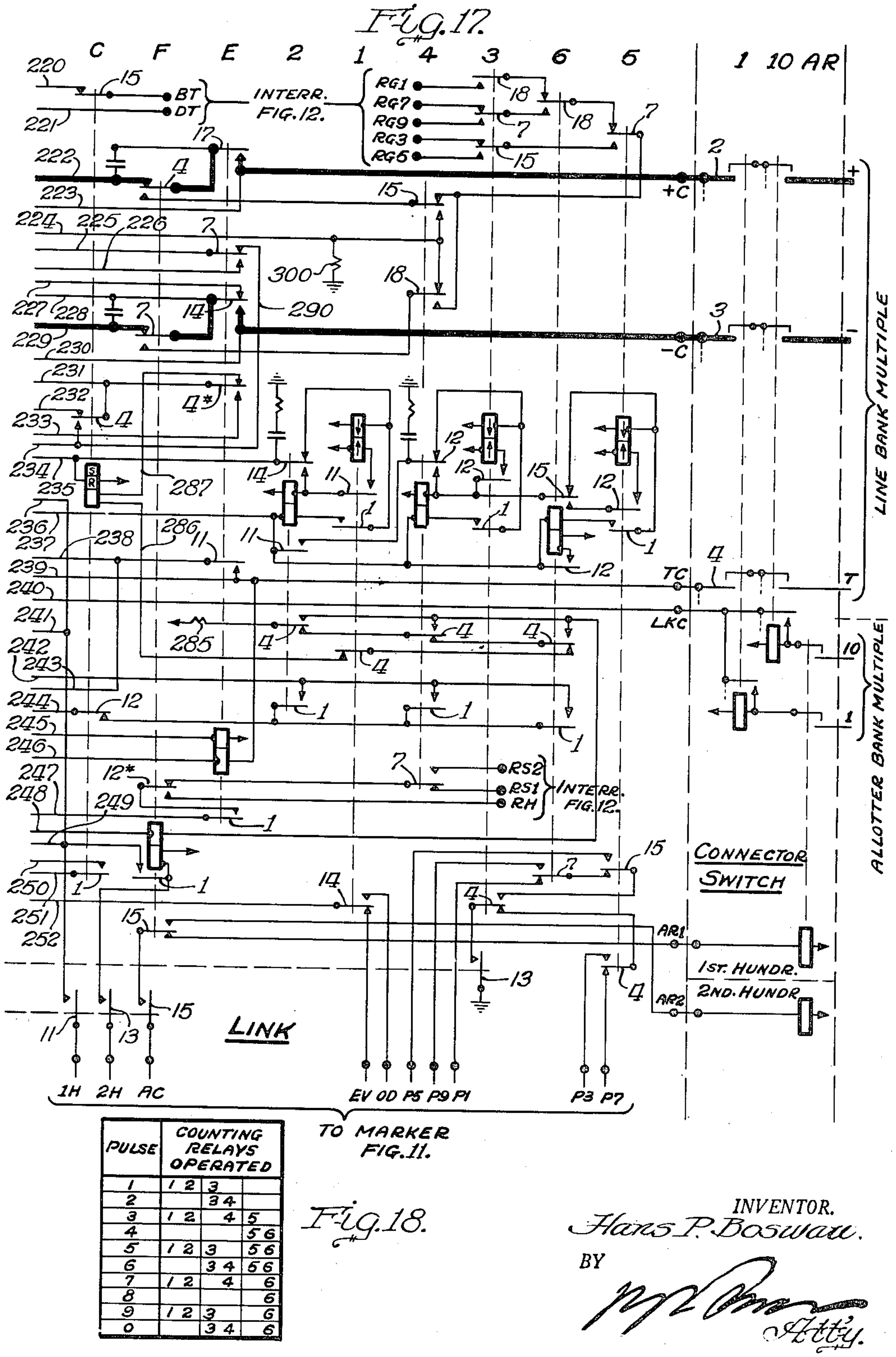

Figs. 16 and 17 taken together illustrate a community automatic exchange or C. A. X link relay circuit associated with a finder and with a connector switch; and Fig. 18 is a diagram showing the operation of counting relays included in the link relay circuit shown in Figs. 16–17.

The new system will now be discussed first in general terms referring to its component parts. These parts will then be described more in detail with reference to the above mentioned drawings, and the description of the component parts will be followed by explaining the operations incident to establishing connections between calling and called lines. A description of the physical structure of the apparatus which is covered in the previously mentioned Patent No. 2,573,889 will for completeness and convenience be included in the following explanations to furnish a better basis for understanding the new system features and circuit means.

*The system and component parts in general*

It will be assumed that the system is provided to serve one hundred subscribers' lines or, if desired, two hundred. It is understood, of course, that this is done for the purpose of giving an example and not to indicate any inherent limitations. The capacity of the system may be increased as desired, with no limitation as to the number of subscribers' lines to be served.

A desired number of switches are arranged in pairs disposed side by side, one switch of each pair operating as a finder and the other as a connector. There may be as many pairs of such finder-connector switches as required in any given circumstances. These pairs of switches form the switching mechanism of the system. Each switch is structurally the same and its individual wiring is the same, whether it is used as a finder or as a connector.

The switching mechanism, i. e., the plurality of pairs of finder-connector switches has a common line bank multiple comprising one hundred sets of removable conductor bars with three bars to each set, the three conductor bars in each set representing the line and test conductors, respectively, of a particular one of the one hundred subscribers' lines. These conductor bars extend serially through the plurality of pairs of finder-connector switches.

Each switch is provided with ten "tens" relays or magnets and with ten "units" relays or magnets. The operation of a tens magnet in conjunction with the operation of a units magnet determines the connection of three conductor bars which are individual to a subscriber's line with three conductors of a switch bus which is individual to the particular switch.

The conductors of the two switch buses of each pair of finder-connectors switches terminate in a "link" circuit comprising a number of relays which exercise selection, control and supervisory functions. There is thus one such "link" circuit individual to each pair of finder-connector switches.

The plurality of pairs of finder-connector switches forming the switching mechanism of the system also have a common allotter bank multiple comprising twenty removable conductor bars which extend serially through the switches just like the conductor bars of the line bank multiple. There are provided in each switch twenty contact fingers, one for making connection with each of the allotter conductor bars. Ten of these contact fingers serve to connect with their associated alotter bars the ten tens magnets of the corresponding switch, and ten of the contact fingers serve in like manner to connect with their respective alotter bars the ten units magnets of the switch. The allotter bars are connected with a common "tens and units guard circuit" and also with a "marker relay circuit" which is likewise common to all the finder-connector switches. An allotter magnet is provided in each switch for simultaneously actuating the twenty contact fingers to extend the ten tens and the ten units magnets to the tens and units guard circuits so as to determine the association of the "finder" of an idle finder-connector link with a calling line, on incoming calls, and also to connect the ten tens and ten units magnets to the marker circuit in order to determine the selection of the called line by the connector under control of the marker circuit, on outgoing calls.

Each subscriber's line has individual equipment in the exchange, referred to as the "line circuit." Such line circuit, in accordance with the invention, comprises new circuit means for controlling the operation of the line and cutoff relays incident to the establishment of outgoing and incoming calls, respectively. The line and cutoff relays are provided with contacts which are serially related with corresponding contacts of line and cutoff relays associated with other lines in a "tens" group of lines for the purpose of aiding the selection of a calling line by a finder in conjunction with the tens and units guard circuits. The guard circuits are common to the switching mechanism and determine which one of several idle links comprising a finder and a set of relays shall serve a call; that is, they determine the association of the line circuit of a calling line with an idle finder which in turn is associated with a set of link relays and a connector.

Also common to the switching mechanism, consisting of a plurality of pairs of finder-connector switches and an associated set of link relays is an "interrupter circuit" comprising a number of relays furnishing ringing codes, busy tone, overflow busy tone, timing pulses for pay station tone, and alarm flashes for transmitting alarms over trunks. The invention also furnishes an example of a "loop dial trunk circuit" for handling trunk calls to a manual office.

These principal component parts and associated equipment will now be described with reference to the drawings.

*The switching mechanism*

The new switch and switching mechanism will be discussed first with reference to the diagram shown in Fig. 1.

Figure 1:
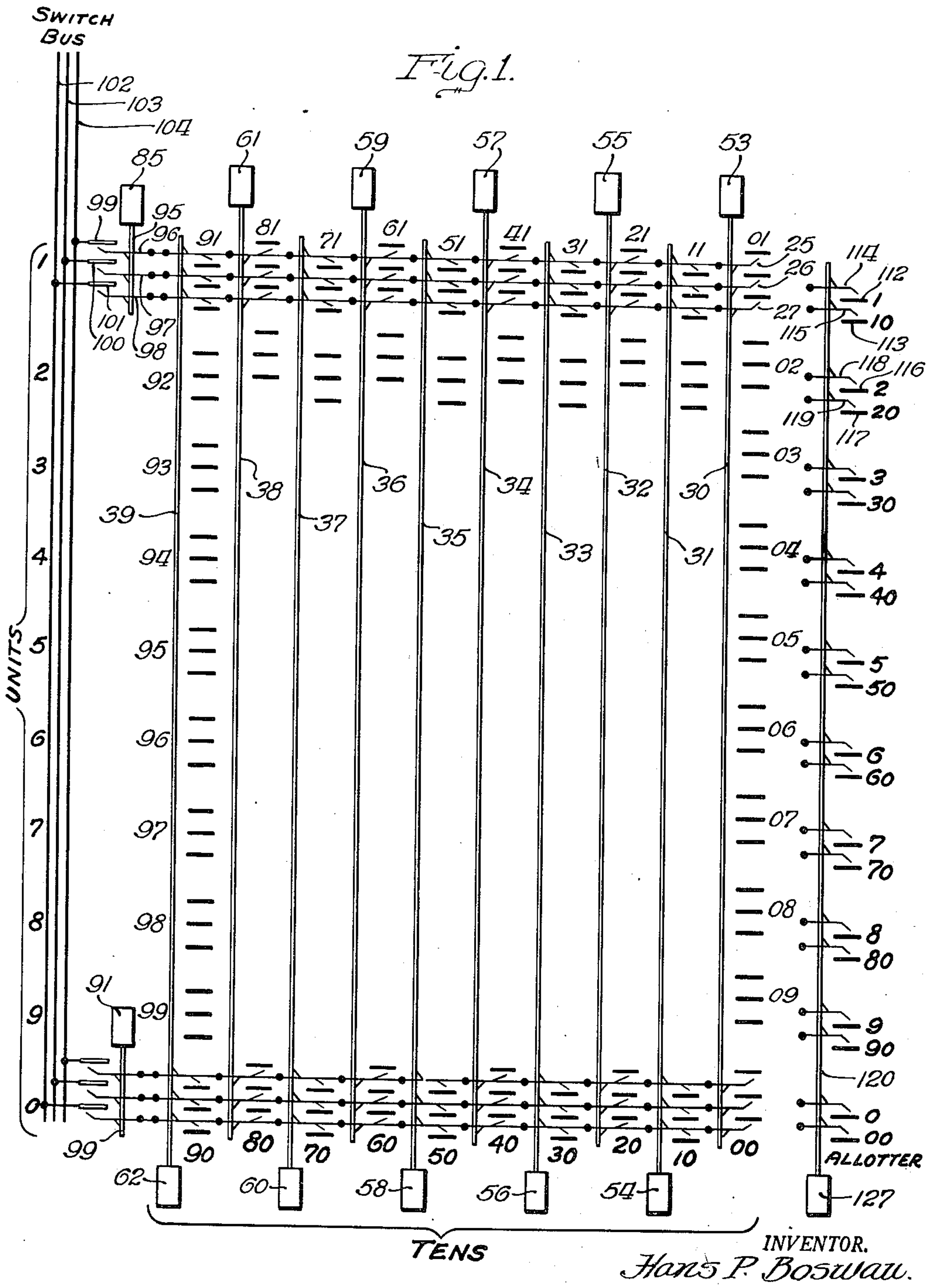

The switch shown in Fig. 1 is one of several switches which form the mechanism. It comprises means for supporting ten rows of conductor bars disposed in parallel relation in one coordinate direction. As shown, these rows of conductor bars are disposed vertically. Each row has ten sets of bars with three bars in each set. These rows of bars form ten "tens" groups of conductors in the line bank multiple of the switch. Each bar extends serially through a number of switches disposed side by side in a direction extending perpendicular to the plane of the drawing. The bars are shown in the form of short, prominent lines in sets of three. Each set terminates in conductors which belong to the individual subscriber's equipment in the exchange. There are thus ten tens groups of lines or bars, as indicated at the bottom of the diagram, from right to left, by prominent numerals 00—10—20—30, etc. to 90. The first tens group contains conductors of lines 01—00. The second tens group contains conductors of lines 11—10, and so forth, and the tenth group contains the conductors of lines 91—90. The numbering scheme may be different from the one shown.

The ten "tens" sub-groups thus form in the other coordinate direction, horizontally as shown in the drawing, ten "units" groups of conductor bars, each units group comprising three rows of bars, ten in each row, as particularly indicated in connection with the top units row or group "1" and with the bottom units row or group "0." In the units group or row "1" there are the terminals of the lines 01—11—21—31, etc. to 91; in the units group "2" there are the terminals of the lines 02—92, and so forth; and in the units group "0" there are the terminals of the lines 00—90. These units groups 1 to 10 are marked by corresponding prominent numerals at the left of the diagram. Only the bars for the units groups "1," "2" and "0" have been shown throughout the bank multiple field of the diagram Fig. 1, while for the remaining units groups "3" to "9," the diagram indicates only the corresponding sets of bars in the two tens groups 00 and 90.

Each horizontally disposed individual row of conductor bars in each units group is provided with a bank spring having ten individual contact fingers, one for each conductor bar in the row, for making contact with such bar and thus connecting it with the bank spring. The bank spring associated with the topmost conductor bars in the units group "1" thus has individual contact fingers such as 25, one for each of the bars; the bank spring associated with the next lower row of bars in this units group has ten contact fingers such as 26, one for each bar in the row; and the bank spring associated with the bottom row of bars in this units group "1" is likewise provided with ten individual contact fingers such as 27, one for each bar in the row. The alternate contact fingers of each bank spring point in opposite directions. The bank springs may be of the type as disclosed in Patent No. 2,396,077.

Each and every units group is similarly equipped with three bank springs, one for each of its horizontally extending rows of conductor bars, and each bank spring has its ten individual contact fingers for connecting its associated bars with the corresponding bank spring. The diagram Fig. 1 shows the bank springs only in conjunction with the top and bottom units groups "1" and "0."

Associated with each tens group of lines or bars 00 to 90 is a "tens" actuator comprising a member extending alongside its corresponding tens group having projections or extensions for actuating the individual contact fingers such as 25, 26, 27 associated with each set of three conductor bars in the corresponding tens group. These ten tens actuators for the ten tens groups 00 to 90 are marked by numerals 30—39, inclusive. Each actuator is associated with a magnet, as indicated at 53—62. The magnets 53, 55, 57, 59 and 61 for the tens groups 00, 20, 40, 60 and 80, respectively, are adapted to actuate the actuator members 30, 32, 34, 36 and 38, respectively, upwardly as shown in the drawing, so as to operate the individual contact fingers associated with the conductor bars in the respective tens groups to make contact with such bars. In similar manner the magnets 54, 56, 58, 60 and 62 are provided for operating the actuators 31, 33, 35, 37 and 39 associated with the tens groups 10, 30, 50, 70 and 90, respectively, downwardly as shown in the drawing, so as to operate the individual contact fingers in the respective tens group to make contact with their associated conductor bars.

Each bank spring is provided with an eleventh contact finger, as indicated at 96, 97, 98 in connection with the bank springs for the units group or row "1." A units actuator 95 is provided which is associated with a magnet or relay 85, and when this units magnet operates, it displaces its units actuator 95 to move the eleventh contact fingers 96, 97, 98 into engagement with fixed contact members 99, 100, 101 which are connected to the conductors 102, 103, 104 of the switch bus. The operation of such a units magnet thus connects the three bank springs with the conductors of the switch bus. Each remaining units group "2" to "0" is provided with its own units actuator operating exactly like the units actuator 95 associated with the units group "1." The units actuator for the units group "0" is indicated by numeral 99 and its associated units magnet by numeral 91. Similar units actuators (not shown in Fig. 1) and associated units magnets are provided for each of the units groups "2" to "9." There are thus ten units actuators and associated magnets for the ten units groups "1" to "0." The fixed contacts such as 99, 100, 101 of the various units groups are multipled to the switch bus conductors 102, 103, 104.

Any one of the one hundred sets of bars in the line bank multiple, each set having three contact bars representing, for example, a subscriber's line, may be connected by the switch to the conductors of the switch bus. The switch bus in turn terminates in the finder link. Assuming, for example, that line 01 is calling, the individual subscriber's line circuit will be "seized" by an idle finder which may be the one shown in Fig. 1, the seizure being accomplished by the operation of the tens actuator magnet 53 for the tens group 00—01 which operates the contact fingers 25, 26, 27 to engage the three conductor bars of the calling line 01, thus extending these bars to the left, through the medium of the three bank springs, to the eleventh contact fingers 96, 97, 98. Upon energization of the units magnet 85, the units actuator 95 is operated to cause the eleventh contact fingers 96, 97, 98 to make contact with the fixed terminals 99, 100, 101 of the switch bus. The line bars associated with the calling line "01" are now connected with the conductors 102, 103, 104 of the switch bus. Any one set of line bars associated with any one of the remaining subscribers' lines may be similarly connected with the conductors of the switch bus.

The finder, as noted before, is associated with a link relay circuit and the latter coacts with a connector which is structurally and functionally exactly like the finder. The called subscriber's line is "selected," in case of an outgoing call, in a similar manner as the calling line is seized by the finder incident to an incoming call. Assuming, for example, that line 01 is calling line 90, the terminals of line 90 in the connector will be extended to the eleventh contact fingers in the units group "0," and units magnet 91 will then operate to actuate the units actuator 99 so as to connect the called line 90 with the terminals 102, 103, 104 of the switch bus, which lead to the associated relay circuit link.

As shown at the right of the diagram, Fig. 1, there is also provided an allotter bank multiple comprising twenty individual conductor bars such as 112, 113, 116, 117. Associated with each of these conductor bars is an individual contact finger. Thus, there is the contact finger 114 for contact engagement with conductor bar 112, contact finger 115 for the conductor bar 113, contact finger 118 for conductor bar 116, and contact finger 119 for conductor bar 117. An allotter actuator 20 is provided which is structurally just like any of the tens actuators 30—39. The allotter actuator is provided with lateral extensions or projections for simultaneously operating the contact fingers such as 114, 115, 118, 119, etc., into engagement with their associated allotter bars such as 112, 113, 116, 117. The allotter magnet is indicated at 127.

The ten allotter bars "1" to "0" are the units allotter bars and the ten allotter bars 10 to 00 are the tens allotter bars. All these bars are connected with the tens and units guard circuits to aid in the selection of calling lines, that is, to aid in the operation of an idle finder, to connect with a calling line, and are also connected with the marker circuit to aid in the selection of a called line by the connector associated with the finder, the marker circuit interpreting the dial impulses delivered to the link circuit which is individual to the particular pair of finder-connector switches.

As will be presently shown, each of the tens magnets 53—62 and each of the units magnets 85—91 is provided with contact springs which are actuated upon operation of the respective tens and units magnets to furnish a holding circuit therefor.

The actual switch structure shown in Figs. 2–5 will be easily understood, bearing in mind the explanations given with reference to the diagram shown in Fig. 1.

Figure 2:
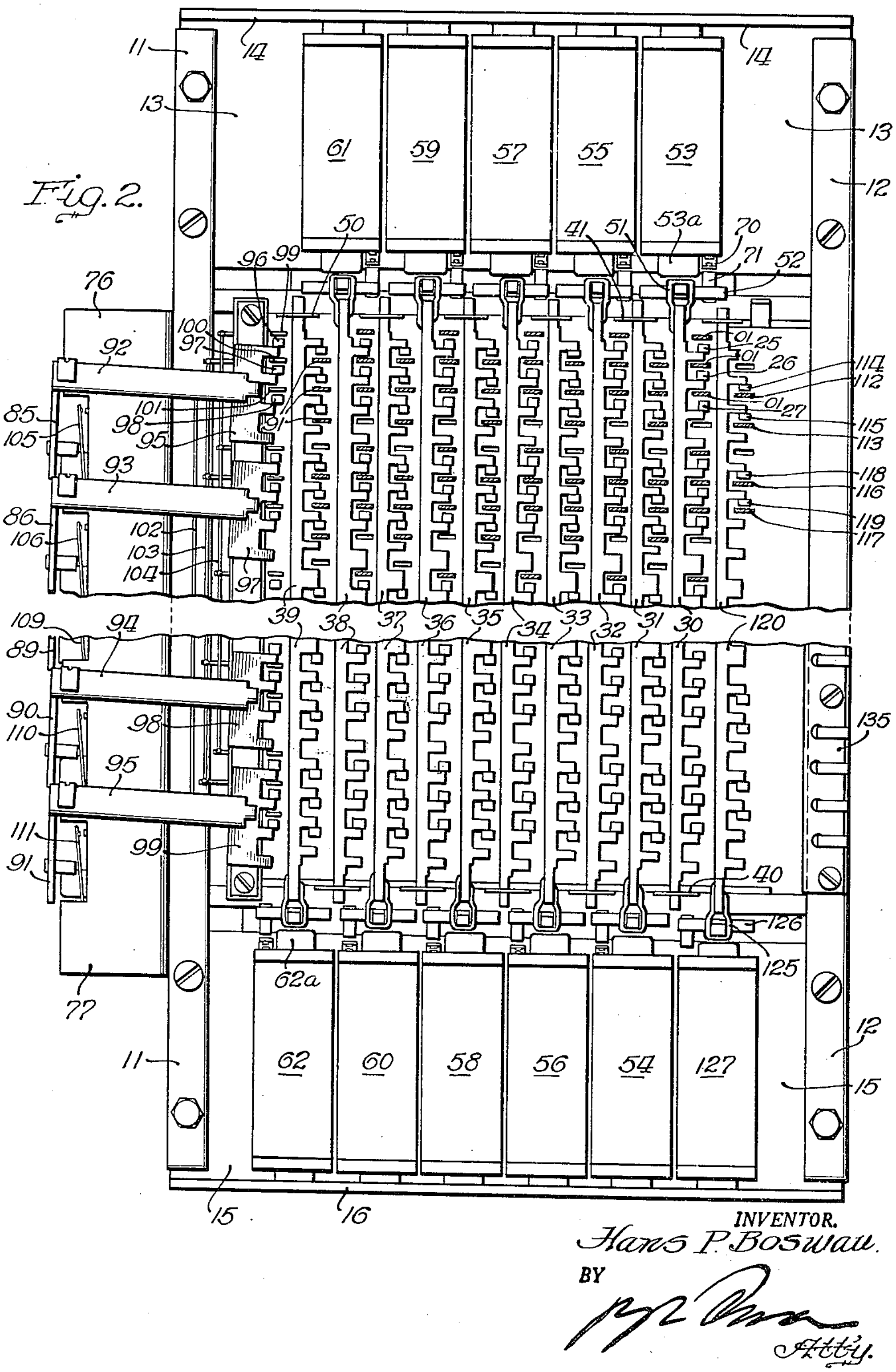
Fig. 2 shows the new switch in diagrammatic side view, as seen when looking in the direction of the arrow along line 2 in Fig. 6.
Figure 3:
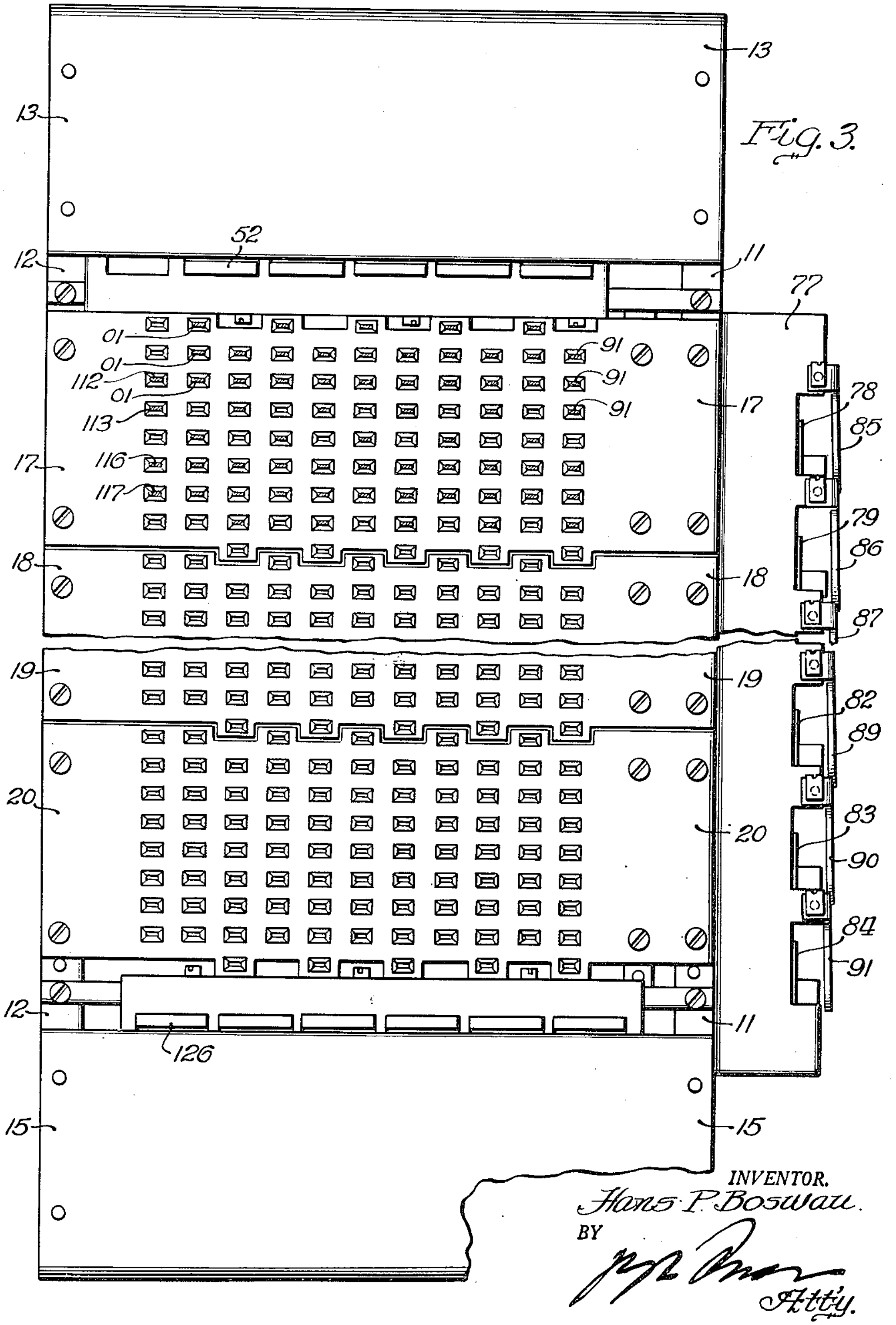
Fig. 3 illustrates the new switch from the opposite side, as seen when looking in the direction of the arrow along line 3 in Fig. 6.
Figures 4, 5:
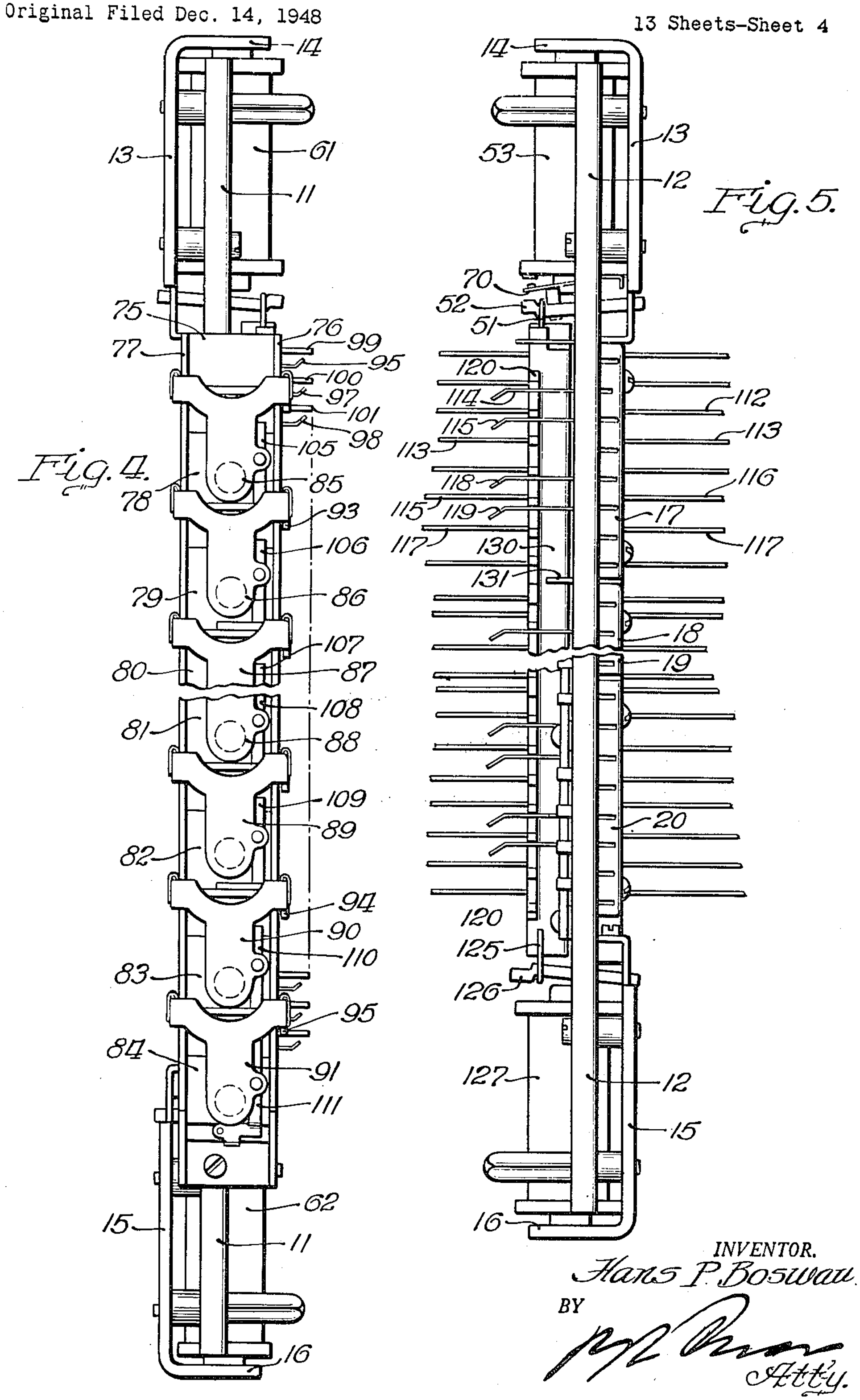
Figs. 4 and 5 are diagrammatic front and rear views of the switch.

As shown in Figs. 2–5, the switch comprises a generally rectangular frame formed by a pair of rail-like members 11—12 which are joined on top by an angular plate 13 forming a ledge 14 and at the bottom by an angular plate 15 forming the ledge 16. Secured to the rail members 11—12, as shown particularly in Figs. 3 and 5, are five plates of insulating material, for example, Bakelite. Only two of these plates are shown in full, marked 17 and 20, and two plates 18 and 19 are shown in fraction. Each plate is provided with eighty-eight holes disposed in eleven vertically extending parallel rows, eight holes in a row. When mounted on the rail members 11—12, as shown, these plates thus form eleven vertically extending parallel rows of holes with forty holes in each row, or a total of 440 holes. Supported in these holes are the conductors of the line bank multiple and, inasmuch as it is assumed that the subscribers' line circuits have three conductors, namely, two line and one test conductor, only three hundred holes would be required for the line bank multiple. The additional ten holes in each of ten vertical rows of the structure are provided in accordance with one object of the invention so as to adapt the switch for accommodating three hundred line multiple bars forming the terminals of one hundred lines each having three conductors, or, alternatively, four hundred line multiple bars forming the terminals of one hundred lines each having four conductors. The eleventh vertical row of holes accommodates the conductor bars for the allotter bank multiple, which is one of the new features of the invention.

The switch structure will be described later on in connection with a system in which the subscriber's line equipment provides for three conductors. Accordingly, only thirty holes in each of ten vertically extending rows of holes are actually used for receiving the metallic conductor bars forming the line bank multiple. These bars are inserted through the corresponding holes in the insulating plates of a number of switches disposed side by side, the bars extending serially through all such switches. There are thus again in the line bank multiple ten vertically disposed parallel rows of thirty bars to each row, each row containing the terminals of ten lines each having three conductors. These are the tens sub-groups of lines numbered 00—90 in Fig. 1.

The numbering scheme may be that already discussed in connection with Fig. 1, identical numerals in Figs. 2–5 referring to identical parts.

The bank springs associated with each horizontal row of line and test bars in each units group or level of the switch is a phosphor bronze spring having ten individual contact fingers, one for making contact with each of the bars in the corresponding row. The structure of these bank springs with their contact fingers is similar to the one described in previously mentioned Patent 2,396,077. In the present case, however, the free ends of the contact fingers are formed to point in alternately different directions. Thus, the free end of the contact finger 25 for making contact with the topmost bar of line 01 points upwardly, as also shown in Fig. 1, in the direction of the topmost bar 01, and all vertically downwardly successive similar contact fingers also point upwardly in the direction of their associated contact bars. The contact fingers in the next tens group point downwardly, and the same scheme is repeated from tens group to tens group, the contact fingers of the bank springs, pointing alternately upwardly and downwardly in the direction of their associated contact bars. The contact fingers associated with the line and test bars of the ten verticaly extending tens groups have been omitted in Fig. 5 in order to avoid confusing the drawing. In Figs. 2 and 3, the line and test bars have been shown within the top portion of the multiple bank.

Each tens actuator 30—39 provided for the respective tens groups and also the allotter actuator 120 is an angularly shaped member made of a suitable insulating material having one edge serrated to form the lateral extensions or projections for operating the various contact fingers of the bank springs, the other edge extending rearwardly as shown in connection with the allotter actuator 120 at 130 in Fig. 5, thus providing a structure which resists warping. A guide 131 (Fig. 5) is provided which is a striplike member extending transversely through the structure in back of the ten tens actuators and the allotter actuator, respectively. This guide has a serrated edge providing notches, one for each of the rearwardly directed edges such as 130 of each actuator to guide and support such actuator. A cross-sectionally U-shaped metallic member may be used for each tens actuator and for the allotter actuator, respectively, in place of the angular member, with holes in its base for the various contact fingers to be operated thereby and carrying a similarly apertured insert of insulating material.

Each tens actuator 30—39 is mounted at one end in engagement with a spring member forming a snubber and an end guide therefor, as indicated in Fig. 2 at 40 and 41, being the snubber and end guide members for the tens actuators 30 and 31, respectively. The allotter bar 120 is at its upper free end likewise associated with such a spring and snubber guide member, as indicated in Figs. 2 and 5. The spring snubber and end guide member for the tens actuator 39 is indicated in Fig. 2 at 50. The snubber and end guide member for the remaining tens actuators and for the allotter actuator are shown in Fig. 2 but are not marked by reference numerals. The opposite end of each tens actuator and also of the allotter actuator is pivotally associated, by means of a cliplike member such as indicated in Figs. 2 and 5 at 51 for the tens actuator 30 and at 125 for the allotter actuator 120, with the armature of its corresponding tens magnet 53—62 and of the allotter magnet 127, respectively. Thus the tens actuator 30 is provided with the cliplike member 51 which associates the actuator with the armature 52 of the tens magnet 53, being the operating magnet for the tens group 00 which contains the line and test bars belonging to lines 01 to 00. The tens actuator 31 is similarly associated with the tens magnet 54 serving the conductor bars of the tens group of lines containing the numbers 11 to 10. The remaining tens actuators 32—39 are in a similar manner associated with their corresponding tens magnets 54—62, respectively. The allotter actuator 120 is in like manner associated with the armature 126 of the alotter magnet 127.

It will be clear from the foregoing description that the tens actuators are disposed for operation in alternately different directions, as already described in connection with Fig. 1. The tens actuators for the tens subgroup 00, 20, 40, 60 and 80 are operatively displaced upwarly responsive to the actuation of the associated tens magnet 53, 55, 57, 59 and 61, while the tens actuators for the tens sub-groups 10, 30, 50, 70 and 90 are operatively displaced downwardly responsive to actuation of the associated tens magnet 54, 56, 58, 60 and 62. The allotter actuator 120 is displaced downwardly by the actuation of the associated allotter magnet 127.

The tens magnets 54, 56, 58, 60 and 62 and the allotter magnet 127 are mounted on the ledge 16 of the angular bottom plate 15, of the switch while the tens magnets 53, 55, 57, 59 and 61 are mounted on the ledge 14 of the angular top plate 13. Numeral 53*a* indicates the core of the tens magnet 53 coacting with the armature 52, and numeral 62*a* indicates the core of the tens magnet 62 which coacts with the corresponding armature associated with the tens actuator 39. Reference numerals for the cores of the remaining tens magnets have been omitted.

As previously stated in connection with the description of Fig. 1, each of the tens actuator magnets is provided with a contact which is closed by its associated armature upon energization thereof and consequently upon actuation of the associated tens actuator. Thus, as is particularly apparent from Figs. 2 and 5, the tens magnet 53 for the tens actuator 30 is provided with the contact 70 which is actuated by an insulating nipple 71 carried by the armature 52, and when the tens magnet 53 energizes it attracts its armature 52, displacing the tens actuator 30 and also closing the contact 70, which is done for the purpose of providing a holding circuit for the magnet 53. Each of the remaining tens magnets 54—62 is provided with a similar holding contact.

At the front of the switch is provided a cross-sectionally U-shaped channel member having the base 75 and the side walls 76—77, as particularly shown in Figs. 2 and 4. This member is suitably secured to the switch frame member 11. Within this channel member are mounted the ten units magnets, seven of which are indicated in Fig. 4 at 78—84. Each units magnet has an armature, as indicated at 85, 86, 87, 88, 89, 90, 91, being the armatures of the magnets 78—84, respectively. Each armature has an arm such as 92, 93, 94, 95 which projects angularly rearwardly, as indicated in Fig. 2 in connection with armatures 85, 86, 90 and 91, respectively. Each arm carries at its free end an insulating member or units actuator as indicated in Fig. 2 at 95, 97, 98 and 99, respectively, each insulating member having a number of projections for actuating the associated eleventh contact fingers of the corresponding bank springs in the respective units groups. Thus the projections extending from the insulating member 95 carried by the arm 92 of the armature 85 are adapted to actuate the three eleventh contact fingers 96, 97, 98 to make contact with the three stationary contact members 99, 100, 101 which in turn are connected with the multiple conductors 102, 103, 104 of the switch bus. Each set of eleventh contact fingers in each units group comprising three fingers is similarly operated into engagement with the associated stationary contacts which are multiplied to the conductors of the switch bus, as already explained in connection with Fig. 1.

It will be observed that each of the units actuators such as shown in Fig. 2 at 95, 97, 98, 99, has four projections, while only three are utilized for actuating the three associated eleventh contact fingers of the corresponding bank springs. The fourth projection, which is not used in the present case, may be employed in structures serving subscribers' lines having four lines and test conductors instead of three, as has been assumed in the present case.

Each of the units magnets is also provided with an individual contact which is operable by its armature upon attraction thereof. As shown in Figs. 2 and 4, the individual contacts thus associated with the units magnets 78—84 are indicated at 105, 106, 107, 108, 109, 110 and 111. As in the case of the corresponding individual holding contacts of the tens magnets, these contacts are provided for the purpose of furnishing holding circuits for the corresponding units magnets.

The conductors for the allotter bank multiple are accommodated in the eleventh vertical row of holes at the right end of the switch, as shown in Fig. 2, and at the left, as shown in Fig. 3. The insulating plates supporting the line bank multiple bars and the allotter bank bars are uniformly made, and there are thus in the eleventh vertical row forty holes, with only twenty utilized for accommodating the twenty allotter bars required in accordance with the explanations furnished in discussing Fig. 1. Each allotter bar is again a stainless steel bar just like the conductor bars for the line bank multiple, and each bar extends serially through a group of switches. The explanations given in discussing the diagram, Fig. 1, are believed to be sufficient for an understanding of the structure of the allotter bank multiple and its associated allotter actuator 120 operable by the allotter magnet 127, as shown in Figs. 2–5. The corresponding parts are marked in these figures in accordance with the marking in Fig. 1.

The new switch structure differs in several respects from prior structures. The arrangement of some of the tens actuator magnets at one end of the switch and other at the other end is a space-saving device which permits use of more powerful magnets, one individually for each actuator, also contributing to circuit simplification. The provision of the allotter bank multiple with its allotter springs and magnet contributes to structural simplification as compared with prior structures. The provision of individual holding contacts, one for each tens and units magnet, contributes toward circuit simplification and reliability of operation. Only one switch structure need be provided to serve as a finder or as a connector, as may be required. The switch structure is standardized and, as has been said before, can accommodate a line bank multiple having sets of conductor bars, each set with three or four bars for use, respectively, with lines having three or four conductors.

Figures 6, 7:
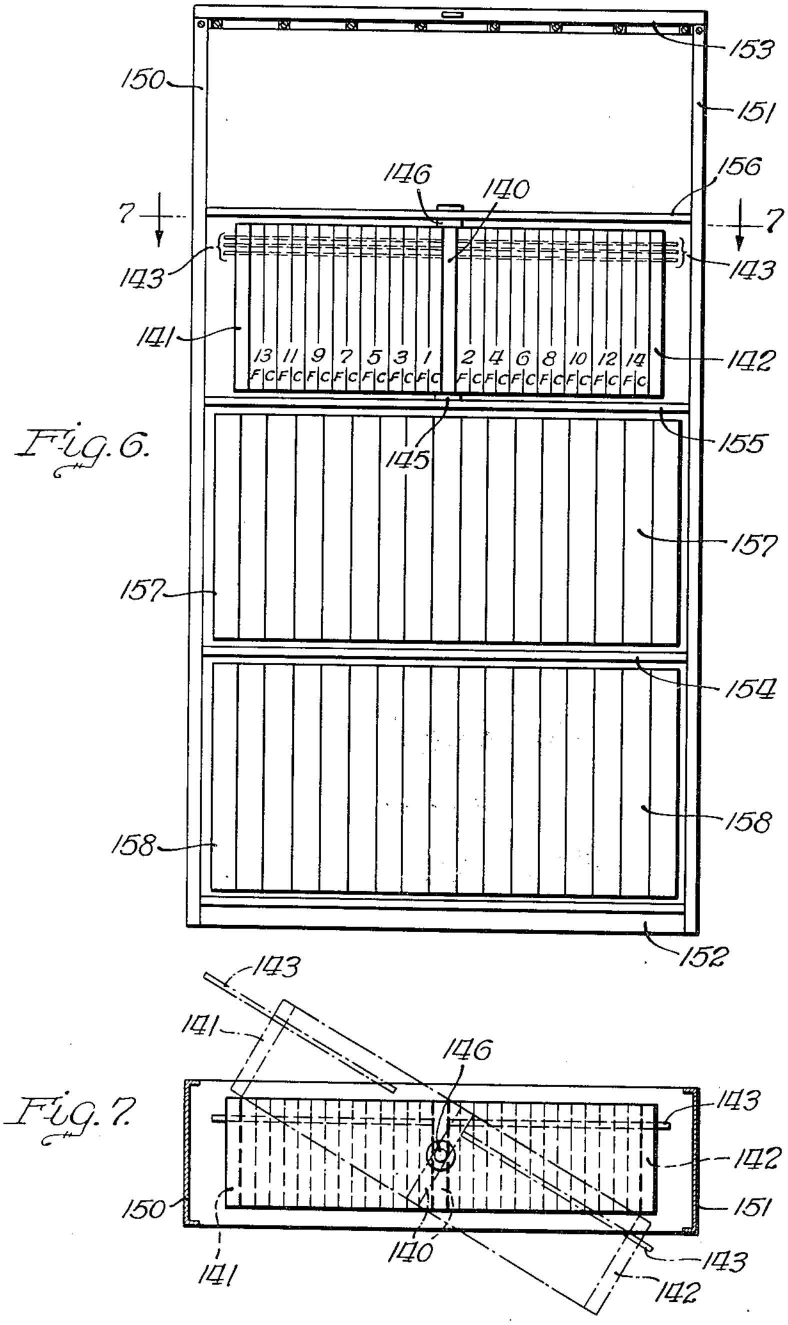
Fig. 6 is a diagrammatic representation of a switchboard.
Fig. 7 is a diagrammatic sectional view of the switchboard taken approximately along lines 7—7 of Fig. 6.

The arrangement of a plurality of pairs of finder-connector switches and associated relay and other equipment on a board is diagrammatically indicated in Figs. 6 and 7. The board is a suitable frame and sheet material structure having two walls diagrammatically indicated at 150 and 151, the bottom 152 and the top 153. Within the board may be provided suitable cross and mounting members 154, 155, 156 which define the shelves or spaces for the various groups of apparatus.

The sets of "link circuits," one for each pair of finder-connector switches, as well as the set of relays forming the common "marker circuit" and common "interrupter circuit" may be suitably disposed within the spaces defined by the rectangule 157. The sets of relays forming the common tens and units "guard circuits," as well as the individual line equipment, may be disposed in the spaces defined by the rectangles 158. Each set of equipment is provided with jack contacts and is jacked into corresponding jack terminals provided in the board.

The switches, each of which is provided with jack contacts as shown in Fig. 2 at 135, are removably arranged on a shelf side by side, each being jacked into corresponding jack terminals associated with the shelf. A group of the switches is disposed in the shelf on either side of the bank jack 140 which has been described in the U. S. Patent No. 2,485,986 and need not be further referred to at this place, except to state that it is a structure carrying an insulating plate provided on either side with jack terminals for receiving from each side the conductor bars forming the line bank multiple and the allotter multiple, respectively. At each end of the shelf is an end guide, as indicated at 141—142, which comprises an insulating plate having holes corresponding to the holes in the insulating plates in each switch for starting the insertion of the conductor bars through the group of switches until the free end of each bar engages its jack terminal in the bank jack 140. A group of three bars 143 is shown inserted through the end guide 141. The bars extend through all the switches at the left of the bank jack 140, the inner ends thereof terminating in the jack terminals therein. Three similar bars 143 are shown which are inserted from the right of the mechanism through the end guide 142 and are threaded through the holes in the insulating plates of the successive switches until their inner ends are in engagement with corresponding jack terminals in the bank jack 140. There are three hundred line and test bars and twenty allotter bars extending into the switch structure from the left through the end guide 141 and three hundred twenty similar bars extending into the switch structure through the end guide 142. These bars being joined at the bank jack 140 thus divide the structure into two distinct groups each of which can be manipulated individually and both of which form the switching mechanism. In other words, the conductor bars of the line bank multiple and of the allotter bank multiple at the left of the bank jack 140 are conductively joined with corresponding conductor bars extending through the switches at the right of the bank jack 140. The arrangement simplifies addition and removal of switches for repair and other purposes, as pointed out in previously mentioned Patent No. 2,485,986.

There are in the switch shelf, as shown in Fig. 6, fourteen pairs of switches, each pair comprising a finder and a connector designated by "F" and "C," respectively. More or less may be provided, depending on the traffic that has to be handled. A second shelf of switches may be provided in the top space of the board, which is structurally just like the one discussed, serving the second hundred lines in a 200-line board.

The switch shelf is pivotally mounted at 145–146. It is thus possible to rotate the entire switching mechanism, with all its fourteen pairs of finder-connector switches, from the full-line position shown in Fig. 7 to the dotted-line position, and in this position the line bank multiple bars as well as the allotter bars can be withdrawn from either end of the structure, as indicated in connection with the bar 143. If it is necessary, for example, to replace or repair a switch or to add switches to the mechanism, all of the bars forming the line bank multiple and the allotter bank multiple are withdrawn, whereupon any one of the switches in the corresponding group can be removed by pulling it out forwardly from engagement with the associated jack. The mechanism is not put out of operation, as calls may be handled over the switches of the group at the other side of the bank jack 140. The pivot points 145—146 are rearwardly offset from the center line to avoid strain on the cable extending from the contacts of the bank jack.

The selection scheme has been briefly explained in connection with the description of Fig. 1. It will aid in understanding the invention to discuss the selection scheme a little more in detail with reference to Fig. 8.

The figure illustrates in a schematic manner two finders and two connectors of a 100-line system. For the sake of clarity, only nine of the one hundred lines are shown, and each is represented by a single conductor, although actually three or more conductors are of course provided in the switchboard for each line. So far as the functions of the finders and connectors are concerned, it will be sufficient to say at this place that a connection is completed in the following steps: (1) a calling line automatically engages an idle finder and connector for the duration of the connection; (2) the finder controlled by the line relay of the calling line connects such line to the connector by way of the associated link relay circuit; (3) the calling party then dials the desired number which is received by the connector relays; and (4) the connector relays cause the connector to make connection to the called line, if idle.

Assuming that line 31 is calling and that finder 1 is seized for the call, the tens actuator 30 in this finder is operated to connect lines 30–39 to the bank springs of the switch, and units actuator 1 is operated to connect its bank spring fingers to the switch bus conductors. The other nine bank spring sets remain open at their unoperated units actuator contacts. Line 31 is now connected to the associated link relay circuit provided for the pair of switches, namely, the finder 1 and connector 1.

When the desired number is dialled, the connector relays in the link circuit function to cause operation of a tens actuator and of a units actuator in the connector. Assuming that No. 23 is dialled, the tens actuator 20 of the connector 1 functions to connect lines 20—29 to the connector bank springs, and units actuator 3 connects its eleventh bank spring fingers to the terminals of the connector bus conductors, thus completing the connection from the finder 1 through the connector 1 and its relays to line 23. The other nine lines of the group 20—29 are kept open at the other units actuator contacts.

Figure 8:
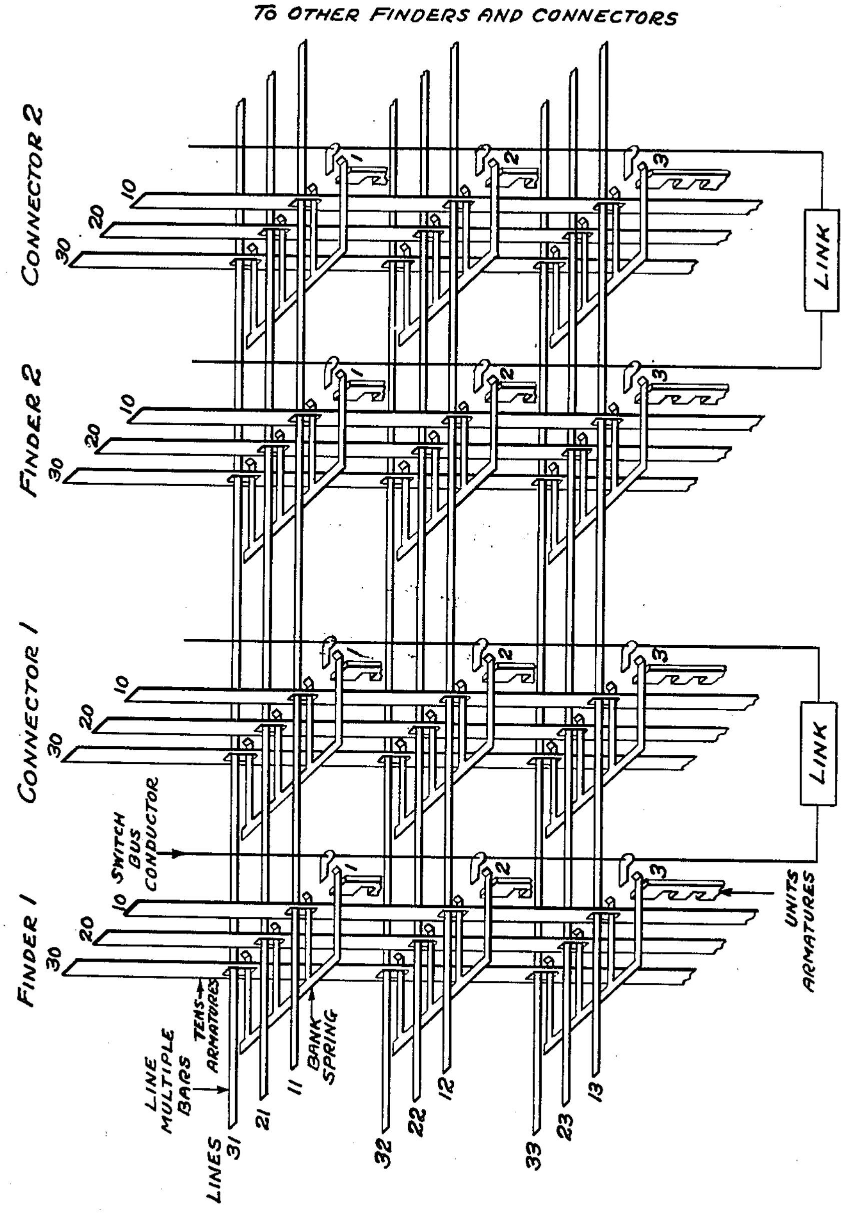
Fig. 8 is a diagram showing the basic selection scheme of the new system.

The complete connection may be traced from line 31 in the upper left hand corner of the diagram Fig. 8, following the horizontal multiple bar of this line to tens actuator 30 of finder 1, then through the contacts closed by tens actuator 30 and the bank spring fingers actuated by units actuator 1 to the finder bus conductor through the link relay circuit and the connector bus conductor, to the bank spring finger actuated by units actuator 3, and through the bank spring to its contacts closed by tens actuator 20 and from there through the line bank multiple to line 23.

Another call may be set up over the pair of switches forming the finder 2 and the connector 2 while the first call is in progress, without in any way affecting the first call. Fig. 8 illustrates only two finders and two connectors, the additional finders and connectors being in every respect the same as those shown. For clearness, all tens actuators in Fig. 8 are shown as operating upward; in the actual switch, as explained before, the tens actuators 10, 30, 50, 70 and 90 operate downward.

The explanations so far deal with a 100-line system, but the same selection scheme is applied to systems of any size. The 100-line group may be enlarged to two hundred lines by using two 100-line switches for each finder and connector. For still larger systems, one or more stages of switches, wired as selectors, may be interposed in well known manner between the finder and connector groups. Thus automatic telephone systems of any desired size may be built up.

*The line circuit*

Figures 9, 14, 15:
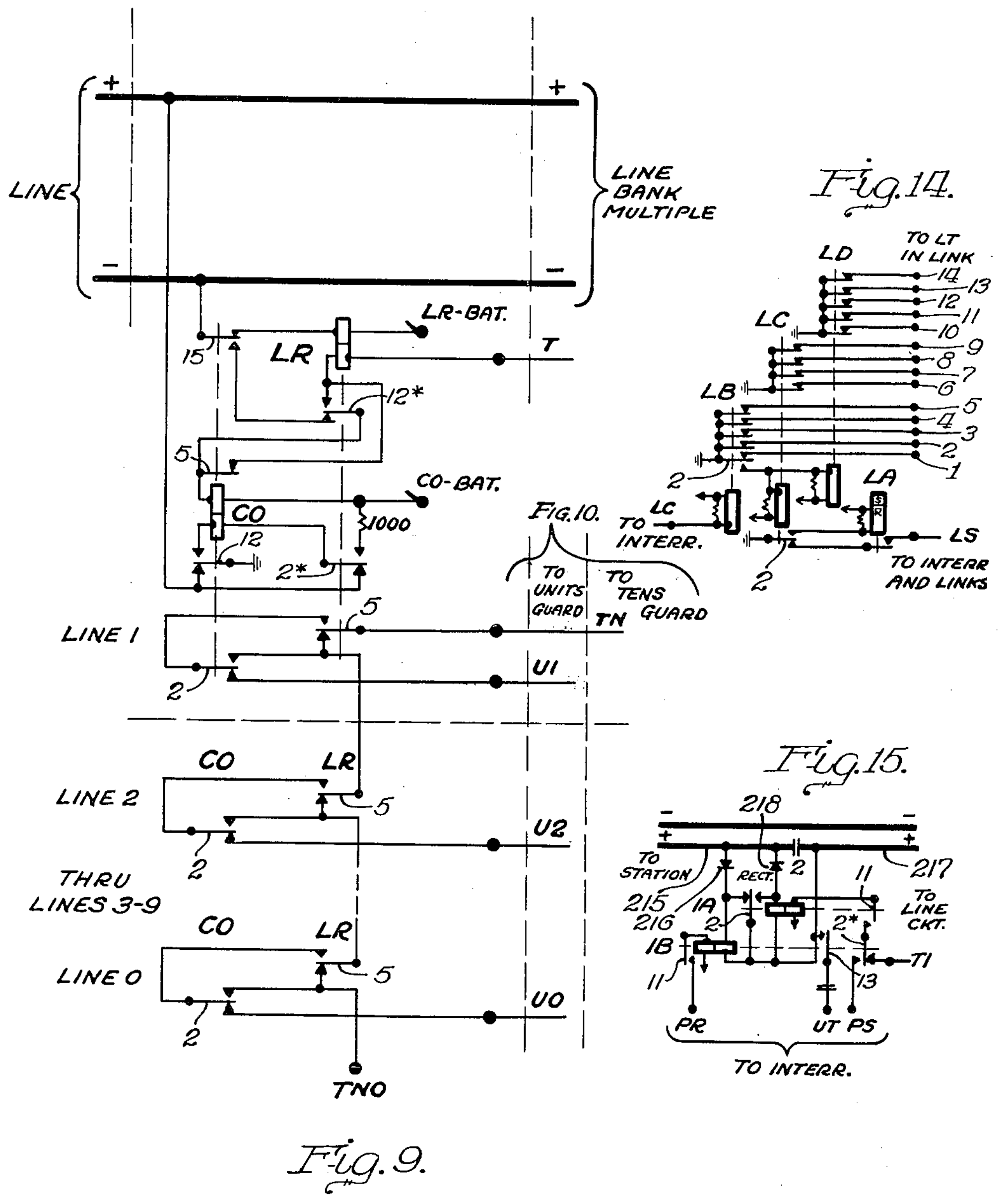
Fig. 9 illustrates an example of a line circuit.
Fig. 14 is a lockout relay circuit.
Fig. 15 shows an example of a pay station circuit.

A line circuit such as shown in Fig. 9 may be provided for each subscriber's line. It represents the subscriber's individual line equipment at the exchange. The two line conductors shown in prominent lines at the top of the figure extend to the left where they connect with the subscriber's telephone set. At the right these two conductors and a test conductor T extend to the corresponding line and test conductor bars provided for the particular subscriber in the line bank multiple of the switching mechanism which comprises the pairs of finder-connector switches. The line is thus accessible to any one pair of finder-connector switches.

Figure 10:
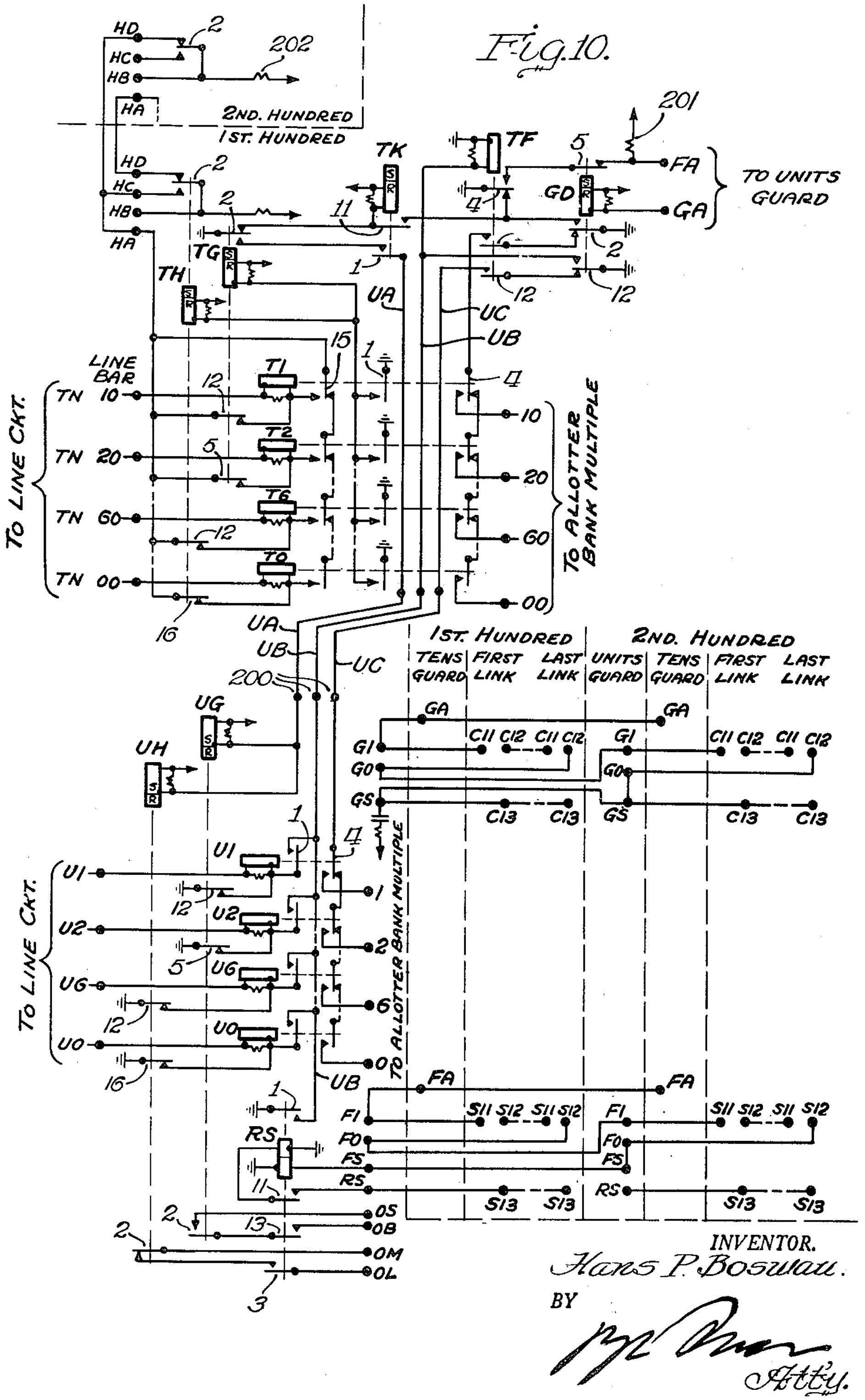
Fig. 10 shows tens and units guard relay circuits.

The line circuit coacts with the tens and units guard relays shown in Fig. 10 and may be conveniently considered in groups of ten, serving ten lines with the same tens digit in their line numbers. The drawing shows the line circuit for line No. 1 in any tens group, for example, line 01 in the tens group, comprising lines 01 to 00, as shown in Fig. 1. Of the remaining line circuits 2 to 0 in this group, Fig. 9 shows only serially related contacts controlled by the corresponding line relays LR and the cutoff relays CO of the group. Conductor TN terminates in the tens guard relay T1 (Fig. 10) provided for the particular tens group, and conductors U1, U2, etc. to U0 terminate each in units guard relays U1, U2, etc. to U0, as shown in Fig. 10.

The contacts operated by the line and cutoff relays LR and CO are indicated along the axis of the respective relays and are marked by low numerals to avoid undue complications in the description as well as in the drawings. In order to avoid confusion, it is necessary to keep in mind the scheme that has been adapted for designating the various parts. The line relay LR, for example, has three transfer contacts designated by numerals 12, 2 and 5, respectively. The cutoff relay CO has three transfer contacts designated 15, 12 and 2, respectively, and in addition thereto a break contact 5. Each contact will be referred to in terms of function and association with its respective relay. Thus, the circuit which results on incoming calls, that is, initially when the subscriber lifts the receiver to make a call, will be described as extending from battery on conductor LR—BAT, through the upper winding of LR, CO*b*15 (which is the break contact 15 of the CO relay) over the line to CO*b*12 (which is the break contact 12 of the CO relay), to ground, causing energization of the line relay LR. The two contacts 15 and 12 of the cutoff relay CO are thus plainly identified, the letter "*b*" in the designations "CO*b*15" and "CO*b*12" referring to the "break" side of each contact, that is, to the normal position in which the contacts are shown in the drawing. Similarly, designations such as "LR*m*12" or "CO*m*12" mean the "make" contacts 12 of the respective relays, that is, the operated position of the two contacts.

Contacts marked by a numeral and an asterisk indicate that the corresponding contact is adjusted for "make-before-break" operation.

This general scheme of identifying contacts will be adhered to throughout the description of the various circuits.

Referring now to the line circuit shown in Fig. 9: The lifting of the hand set at a subscriber's station closes a D. C. bridge across the line operating LR from battery on LR—BAT through the upper winding of LR, CO*b*15 over the line to CO*b*12 to ground. LR closes a circuit from tens guard conductor TN over LR*m*5, CO*b*2, to one of the units conductors U1—U0, depending on the corresponding tens and units digits of the calling line. This operates the tens guard relay and the units guard relay (Fig. 10) corresponding to the tens and units digits of the calling line. These relays cause the finder switch of an idle link (Figs. 16–17) to select the calling line.

The line relay LR also opens the series circuit to the contact LR*b*5 of the next line (line 2) to prevent double selections, if two or more lines should happen to be call-at the same instant, as will be explained in connection with the description of the tens and units guards shown in Fig. 10.

The terminal TNO (bottom of Fig. 9) is provided for testing the series circuit from the conductor TN through all ten lines.

The finder (Fig. 16) selecting the calling line connects ground to the test wire T, holding the line relay LR and operating the cutoff relay CO from ground on test wire T over the lower winding of LR, LR*m*12, upper winding of CO to battery on CO—BAT. The cutoff relay CO opens the circuit from tens guard conductor TN to the associated units guard lead such as U1 at CO*b*2, releasing the tens and units guard relays and reestablishing the circuit from conductor TN to contact LR*m*5 over CO*m*2 so that other lines in the 10-line group can make calls. For example, if line 2 in the same tens group should now make a call, the tens guard relay T1 and the units guard relay U2 (Fig. 10) will be operated in a circuit extending over conductor TN, LR*m*5, CO*m*2 (line and cutoff relays of line 1 being energized), LR*m*5 of line 2 (which initiates a call), CO*b*2 (of line 2), conductor U2 to the units guard (Fig. 10) and winding of units guard relay U2.

With the line relay LR and the cutoff relay CO operated, the windings of both relays are disconnected from the plus and minus conductors of the line at CO*b*15, LR*b*12, CO*b*12 and LR*b*2, clearing the line for dialling and talking.

An auxiliary circuit is closed at this instant for the cutoff relay CO from ground through CO*m*12, lower winding of the cutoff relay CO, LR*m*2, resistor *r*, to battery on CO—BAT for purposes which will be explained later on.

On outgoing calls, that is, when the line is called, the connector switch (Fig. 17) selecting the line connects ground to its test wire T, operating the line and cutoff relays LR and CO in series over the lower winding of LR, CO*b*5, upper winding of CO, to battery on CO—BAT. Due to a much larger number of turns in its winding, the line relay LR operates before the cutoff relay CO, maintaining the circuit over LR*m*12 before the cutoff relay CO can break it at CO*b*5. The subsequent functions of the circuit are the same as for incoming calls.

When the connection is released, either on an incoming call or on an outgoing call, ground is removed from the test wire T, opening the circuit of the line relay LR, while the cutoff relay CO is still being held over CO*m*12, lower winding of CO, LR*m*2, resistor *r*, to battery on CO—BAT. The release of LR before breaking this circuit for CO connects the cutoff relay CO momentarily to the line loop from battery on CO—BAT through the upper winding of CO, LR*b*12, CO*m*15, over the line to LR*b*2, lower winding of CO, and CO*m*12 to ground. If the hand set is at this time replaced, CO finds the line open and releases, thereby restoring the line circuit to normal. If the hand set is still off the hook, or if the line is shorted, or if it is grounded on the minus line, the cutoff relay CO finds this circuit closed and holds over the line until the hand set is replaced or the line cleared. CO then releases and restores the line circuit to normal.

During lockout, with CO held and LR released, battery through the upper winding of CO is disconnected from the test wire T at CO*b*5 and LR*m*12. Absence of battery on the test wire T makes the line busy.

On reverting calls, CO is held over the line by the talking parties after the link (Figs. 16 and 17) is released, feeding transmitter battery to the line over the two windings of the cutoff relay CO, which are balanced. When the parties hang up, CO releases and restores the line circuit to normal.

The terminal LR—BAT is connected to battery through a low resistance winding of a tone coil. When all lines are busy, overflow busy tone of 120 pulses per minute is transmitted through this coil over LR—BAT, upper winding of LR, CO*b*15, to the line as a signal that no link is available.

There are three novel features incorporated in the above described line circuit, namely, (1) the provision of the auxiliary circuit for CO extending from battery on CO—BAT, resistor R, LR*m*2, lower winding of CO, CR*m*12 to ground, over which CO is momentarily held upon opening the series circuit extending from ground on test conductor T, lower winding of LR, LR*m*12, upper winding of CO to battery on CO—BAT; (2) the use of the auxiliary circuit for the cutoff relay CO on line lockout, and on reverting calls when the two balanced windings of the cutoff relay CO are connected to the line for feeding transmitter battery thereto; and (3) the provision of arranging contacts of the line and cutoff relays LR and CO of a tens groups in series relationship to control operation of the tens and units guard relays.

*The tens and units guard circuits*

Fig. 10 shows in the upper half of the drawing, above the terminals 200, the tens guard circuit and in the lower half, below the terminals 200, the units guard circuit.

The tens guard circuit will be discussed first. Its purpose is to prevent interference between calls, landing at the same time, by preventing the operation in the finder switch (Fig. 16) of more than one tens magnet at the same time.

Ten conductors TN terminate in the tens guard circuit, one for each tens group of subscribers' line circuits, discussed in connection with Fig. 9. Only four such TN conductors are shown coming from the four line circuit tens groups 10, 20, 60 and 00, and terminating each in a relay T1, T2, T6, T0, respectively. The series connections for the wiring of the contacts of these relays with corresponding contacts of similar relays connected with like TN conductors coming from the remaining line circuits in the other tens groups are indicated by dotted lines.

Relay TK is normally operated over TG*b*2. When a subscriber, for example, the subscriber on line 1, Fig. 9, makes a call, his line circuit connects the conductor TN of his 10-line group to ground through the units guard, in this case to ground at U1*b*12 of the units guard (see lower half of Fig. 10) over conductor U1 and contacts controlled by the line relay and by the cutoff relay of the line circuit, Fig. 9. Ground on the TN conductor in the tens guard operates the tens guard relay corresponding to the 10-line group of the subscriber, in this case the tens guard relay T1 for group 10 from battery over the resistor 202, terminals HD—HA which are strapped for 100-line operation, TG*b*12, winding of relay T1, and conductor TN, for the particular tens group through the contacts of the line and cutoff relays of the subscriber's line circuit (Fig. 9) to ground in the units guard. If several calls are coming in at the same time from several lines in other tens groups, more than one of the tens guard relays T1—T0 may be operated.

The relay T1 operates its contact T1*m*1, connecting ground to the relays TG and TH, thus causing operation of these relays which open the original operating circuits of T1—T0 at contacts such as TG*b*12 and TG*b*5 and TH*b*12 and TH*b*16. Relay T1, however, holds over T1*m*15. At T1*b*15 relay T1 opens the battery circuit of any other tens guard relays T2—T0 that may be operated at the time, thereby causing them to release. This insures that only one of the tens guard relays T1—T0 can remain operated, and prevents double tens selections in the finder shown in Fig. 16. The operation of relay TG connects ground over TG*m*2, TK*m*1 and lead UA to the units guard circuit shown in the lower half of the figure, causing functions which insure that no more than one finder units magnet can be operated. The units guard also transfers the circuit of T1 through the conductor TN and the subscriber's line circuit from ground in the units guard to ground over conductor UB and relay TF in the tens guard, causing TF to operate in series with T1 and one of the units guard relays.

Relays T1, TG, TH and TF in the tens guard are now operated. TF connects ground over TF*m*4, GD*b*5 to the conductor FA; also over GD*b*2, TF*m*1, T1*m*4 to the allotter multiple bar 10 serving this tens group, thereby marking the tens digit of the calling line; and over GD*b*12, TF*m*12 and lead UC through the units guard to a units allotter bar, thereby marking the units digit of the calling line. The circuit from TF*m*1 to allotter bars 10—00 is carried through series contacts of relays T1—T0 to prevent crosses between allotter bars, if more than one tens guard relay T1—T0 should operate, as described before.

Ground on conductor FA is carried through terminal F1 in the units guard to terminal S11 of the first link and, if the link is busy, through S12 to S11 of the next link, and so forth, through busy links to S11 of an idle link. Ground on S11 of the idle link operates its finder-allotter relay and thereby the tens and units magnets corresponding to the marked allotter bars. This selects the calling line and operates its cutoff relay in the line circuit shown in Fig. 9.

The cutoff relay opens the circuit of T1 and TF in the line circuit, releasing these relays. T1 opens the circuit of allotter bar 10 and of relays TG and TH. TF opens conductors FA and UC, releasing the finder-allotter relay and freeing the units allotter multiple bars. Slow-to-release relays TG and TH restore after an interval, and this restores the tens guard to normal, ready for the next call.

In case all the link circuits, such as the circuit shown in Figs. 16 and 17, should be busy, a relay RS in the units guard operates from battery through resistance 201 (top of Fig. 10) on conductor FA and places ground on conductor UB, thereby preventing the operation of TF. The tens guard completes the operation of T1, TG and TH, and then waits until a link becomes available, letting TF operate; or until the call is abandoned, releasing T1, TG and TH.

The allotter bank multiple is used not only for selections in the finders under control of the tens and units guards, but also for selections in the connector under control of the associated link circuits. To prevent interference, a link engaging the allotter bank disables the tens and units guard for the brief interval required to perform the selection in the connector. Before it can engage the allotter bank, the link causes relay GD in the tens guard to operate. GD opens conductor FA at GD*b*5, the tens allotter bars at GD*b*2, and also the units allotter bars by opening conductor UC at GD*b*12. This releases the finder allotter relay, if operated, and frees the allotter bank for use by the link. GD also releases TF by shunting it over GD$m$12. After performing its selection, the link releases GD which enables TF to operate and the tens and units guard to engage the allotter bank.

Relay TF opens the locking circuit of slow-to-release relay TK at TF$b$4, but on normal calls TF does not operate long enough to let TK release. If a link engages the allotter bank while a call is landing, GD operates and delays the landing for a brief interval, but TK is held over GD$m$2 during this interval.

In case trouble develops in the link (Figs. 16–17) or in the line circuit (Fig. 9), preventing the proper operation of the cutoff relay, then the circuit of T1 and TF is not opened by the cutoff relay, and TF remains operated longer than the normal time required for landing a call, causing TK to release. TK opens its locking contact TK$m$11 so that it cannot operate again until release of the tens guard closes TG$b$2. Release of TK opens the conductor UA at TK$m$1, causing the units guard to place ground on conductor UB. This releases TF which opens the conductor FA and frees the allotter multiple bars. T1, TG and TH remain operated until the calling party hangs up, preventing operation of TK and TF in order to avoid landing of other calls while the line in trouble is attempting to call.

In case the system is provided for 200-line operation, each of the two 100-line groups will have its own tens and units guard. A call landing in one group opens battery through resistor 202 for relays T1—T0 in the other group at TH$b$2. This prevents interference in case a call should be made in the other group before one group has finished landing.

When calls land in both groups at the same instant, the call in the first hundred is completed first, because its battery circuit is maintained over TH$m$2 and terminals HC—HA, even after its original battery circuit through TH$b$2 in the second hundred is opened.

The units guard circuit shown in the lower half of Fig. 10, below the terminals 200, comprises ten units guard relays, one for each units group of subscribers' line circuits (Fig. 9). Four of these relays are shown at U1, U2, U6 and U0, serving the units groups 1, 2, 6 and 0. The serial relationship between the contacts of relay U2 and corresponding contacts of similar relays U3, U4 and U5 (not shown) and that between the contacts of relay U6 and similar relays U7, U8, U9 (not shown) is indicated in dotted lines. Each units guard relay is connected with a correspondingly marked conductor U1, U2, etc. to U0 leading to the contacts of the line and cutoff relays in the corresponding units group of line circuits, as shown in Fig. 9.

The purpose of the units guard is to prevent interference between calls landing at the same time by insuring that more than one units magnet cannot be operated in a finder switch.

When a subscriber makes a call, his line circuit connects battery through a tens guard relay such as T1 to the conductor TN, as described before and over the serially related contacts of the line relay and the cutoff relay in the line circuit to one of the conductors U1—U0, depending on the units digit of his line number, for example, to the conductor U1 for the units digit 1. This operates relay U1 which prepares to lock over U1$m$1 and conductor UB to the tens guard. If several calls from different 10-line groups are coming in at the same time, more than one of the units guard relays U1—U0 may be operated.

In response to operation of the tens guard relay such as T1 in series with U1, the tens guard disconnects battery from all but one of the tens guard relays, as described before, so that units guard relays U1—U0 can be operated from only one 10-line group. Series contacts in each line group enable it to close the circuit for only one U1—U0 conductor at a time. This insures that only one of the units guard relays U1—U0 can remain operated, and prevents double units selection in the finder shown in Fig. 16.

At the same time the tens guard applies ground to conductor UA over contacts of relays TG and TK, which operates relays UG and UH in the units guard. These relays remove ground from all relays U1—U0 to prevent operation of another relay U2—U0, if other calls should land in the same 10-line group at this time. Relay U1 remains locked over U1$m$1 and conductor UB through relay TF in the tens guard which now operates because ground on U1 is opened and initiates seizure of an idle link.

After seizing a link, U1, UG and UH being operated, the tens guard applies ground to conductor UC which is connected by contact U1$m$4 to allotter multiple bar 1, thereby marking the units digit of the calling line and operating the corresponding units magnet in the finder.

The circuit from conductor UC to the allotter multiple bars 1—0 is carried through series contacts of relays U1—U0 to prevent crosses between allotter multiple bars, if more than one units guard relay U1—U0 should operate, as mentioned before.

When the calling line is selected by the finder (Fig. 16) and its cutoff relay CO (Fig. 9) operates, the circuit of conductor U1 is opened in the line circuit, releasing relay U1 and the tens guard relays through which it is operated. The tens guard releases and removes ground from conductor UA. Slow-to-release relays UG and UH restore after an interval and reconnect ground to relays U1—U0 in preparation for the next call. This insures that a new call cannot engage the tens and units guard until they are completely restored to normal.

There is also a link guard circuit which is carried from terminal GA in the tens guard through terminals GI, GO and GS in the units guard for convenience in making the necessary connections for 100-line and 200-line boards. Spark protection is provided on terminal GS.

The links with their associated finder and connector switches are taken into use in rotation. So long as one or more links are available for calls, conductor FS is held open in the links. Seizure of the last idle link connects battery through resistance 201 on conductor FA in the tens guard over F1 in the units guard, through the links to F0 and FS. This operates relay RS which connects ground through its upper winding and RS$m$11 over the reset conductor RS to the links. If any links are idle, ground on conductor RS operates link relays which open conductor FS again. Relay RS holds over conductor RS until all link relays in the reset circuit have operated.

The 200-line board's conductors FS in the two hundreds are connected together. This causes both relays RS to operate when the last idle link in either hundred is seized, thereby resetting all idle links in both hundreds.

In case all links should be busy, the relay RS operates, as described above, and places ground over RS$m$1 on conductor UB to the tens guard for purposes explained in the tens guard description. If a call comes in at this time, UG operates and closes a circuit from conductor OS over UG$m$2, RS$m$13 to terminal OB for starting the overflow busy interrupter. An overflow meter can be operated over conductors connected to the terminals OM and OL.

There are several novel features in the tens and units guard circuits including, for example, (1) the operation of the tens and units guard relays serving particular tens and units subscribers' groups over a circuit controlled by the subscribers' line and cutoff relays; (2) the simultaneous marking of the tens and units allotter bars serving the corresponding tens and units groups; (3) the marking of a conductor which is serially carried through the links to cause actuation of the allotter magnet or relay of an idle link so as to cause simultaneous operation of the tens and units magnets of the finder associated with such idle link to select the called line and to connect its line and test conductors through to the idle link; and (4) the freeing of the allotter bars and the blocking of operation of certain control relays, in order to prevent landing of other calls while a line in trouble is attempting to make a call. There are other novel features which will be presently brought out.

*The marker circuit*

Figure 11:
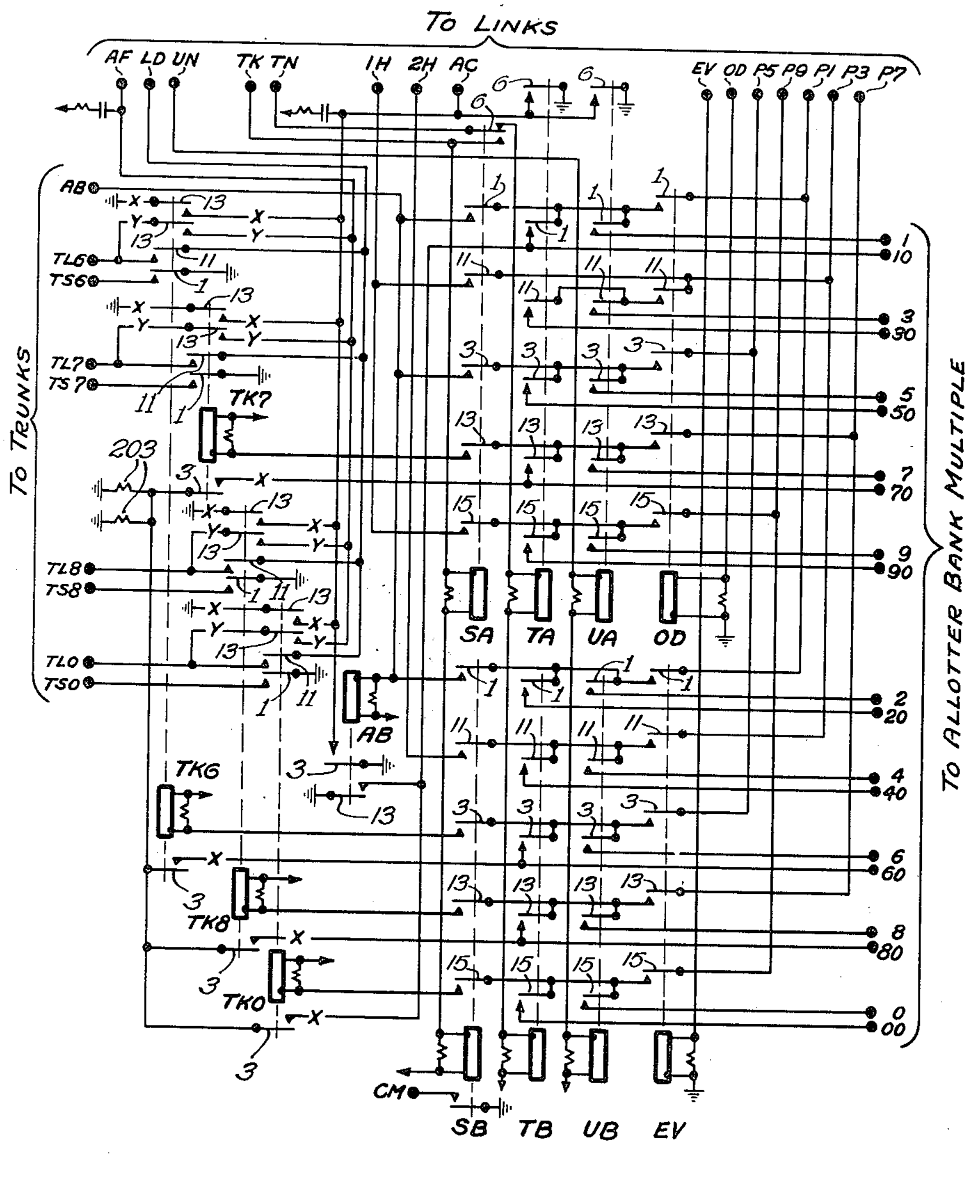
Fig. 11 illustrates a marker circuit which controls selections in accordance with the numbers dialled.

The marker is shown in Fig. 11. It is common to all links (Figs. 16–17) and can be seized only by one link at a time. It associates the link for a fraction of a second with the common allotter bank multiple or with common trunk selection relays to control selections in accordance with the number dialled.

To engage the marker the link closes a circuit from lead OD or EV to one of the conductors TK, TN or UN. The link connects to the conductor OD for an odd number or to EV for an even number. The connection is carried to conductor TK for the first or prefix digit, to TN for the tens digit, or to UN for the units digit. These connections operate the marker relays from ground on OD or EV to battery on SB, TB or UB as follows:

| Number Dialled | Leads Connected | Relays Operated |
|---|---|---|
| First Digit Odd Number | TK—OD | SA SB OD |
| First Digit Even Number | TK—EV | SA SB EV |
| Tens Digit Odd Number | TN—OD | TA TB OD |
| Tens Digit Even Number | TN—EV | TA TB EV |
| Units Digit Odd Number | UN—OD | UA UB OD |
| Units Digit Even Number | UN—EV | UA UB EV |

To indicate the number dialled, the link applies ground to one of the five leads P1, P3, P5, P7, P9, as follows:

to lead P1 for 1 and 2
to lead P3 for 3 and 4
to lead P5 for 5 and 6
to lead P7 for 7 and 8
to lead P9 for 9 and 0

Operation of relay OD connects the five leads P1, P3, P5, P7, P9 to selection control circuits corresponding to Nos. 1, 3, 5, 7 and 9, and operation of the relay EV connects these leads to circuits corresponding to Nos. 2, 4, 6, 8 and 0. The link furnishes in this manner complete information regarding the digit and number dialled to the marker circuit over three of the ten conductors TK, TN, UN, OD, EV, P1, P3, P5, P7 and P9.

It is assumed for convenience that the prefix digit 1, 2 or 5 is unassigned. In this case relays SA, SB and OD or EV operate. For Nos. 1, 2 or 5 ground from conductor P1 or P5 is connected to relay AB which in turn applies ground to conductor AC and to the allotter multiple bar 10, causing the allotter magnet and the tens magnet 10 in the connector switch (Fig. 17) to operate. In response, the link sends out busy tone to the calling line.

It is further assumed, for the sake of convenience, that the prefix digit 3 or 4 is used for local calls. In this case relays SA, SB and OD or EV operate. For Nos. 3 or 4 ground on conductor P3 is connected by relay SA to link conductor 1H to prepare the link for a local call. For No. 4, but not for No. 3, ground on conductor P3 is also connected by relays SB and EV to link conductor 2H to transfer the subsequent tens and units selection in the link to the second hundred. In response to ground on 1H, the link transfers the circuit from conductor TK to TN, but the circuit to relays SA and SB is maintained over the contact SA*m*6.

Let us further assume that the prefix digit 9 is used in the case of a pay station call, in which case relays SA, SB and OD operate. For No. 9, ground on P9 is connected by relays OD and SA to conductor 1H to prepare the link for a local call the same as for No. 3.

Trunks may be connected to regular line circuits, or they may be terminated on individual switches per trunk. In the first case, incoming and outgoing trunk calls are handled by the regular links; in the latter case, incoming trunk calls do not engage the regular links, and outgoing trunk calls need a link only for the time it takes to dial the trunk number. The trunk selections relays TK6, TK7, TK8 and TK0 in the marker use X-wiring for trunks on lines and Y-wiring for trunks on switches. Both types of wiring can be used in the same marker for different trunk groups.

An example of a trunk circuit will presently be given. The following considerations apply for calls to trunks on lines (X-wiring): When prefix 7, 8 or 0 is dialled, relays SA, SB and OD or EV operate trunk selection relays TK6, TK7, TK8 or TK0 from ground on P5, P7 or P9. To take an example, TK0 applies direct ground to conductor AC at its contact TK0*m*13; ground through the resistors 203 to allotter multiple bar 10 at TK0*m*3; and direct ground to conductor TS0 at TK0*m*1, which is carried through shift relays in the trunks to a units allotter bar corresponding to the units digit of the first idle trunk. These grounds operate the allotter magnet, the tens magnet 10 and the units magnet in the connector switch, thereby selecting the trunk. Relay TK0 also connects conductor TL0 to the link conductor LD. Unless all trunks in the group are busy, ground from the trunks over TL0, TK0*m*11 and LD operates the relay in the link to prepare it for a trunk connection. The resistor 203 prevents release of the shift relay in the selected trunk until the marker has restored to normal, as will be presently explained in connection with the loop dial trunk line shown in Fig. 13.

The following considerations apply in the case of calls to trunks on switches (Y-wiring): Relay TK0 (or another trunk selection relay) operates as described in the foregoing discussion in connection with calls to trunks on lines. With Y-wiring relay TK0 connects ground to conductor TS0 and ground from TL0 to conductors AF and LD, but no ground to conductor AC or to the allotter multiple bars. Ground on conductor TS0 is carried through shift relays in the trunks and operates the allotter relay of an idle trunk switch; ground on conductor AF operates the finder allotter magnet of the link, making the call; and ground on conductor LD operates the relay in the link which prepares it for a trunk connection. With the allotter magnets in the trunk and in the finder operated, the locking ground of the operated tens and units magnets in the finder is carried through the allotter multiple bars to the same tens and units coils in the trunk switch, operating these coils and thereby causing the trunk switch to select the calling line. At the same time the link relay operated over conductor LD causes the link to release, because no selection has been made in the connector switch of the link.

If all trunks in a called group are busy, the trunk shift relays keep conductor TL0 open and carry ground on conductor TS0 through the trunks to conductor AB, operating relay AB, which causes the link to send out busy tone, as already explained in connection with the dialling of the unassigned prefix digits 1, 2 or 5. Similar operations take place when no trunks are assigned to prefix digits 6, 7 or 8.

The tens digit causes operation of relays TA, TB and OD or EV. This applies ground to conductor AC and connects ground from one of the leads P1—P9 to a tens allotter bar, causing the allotter magnet and the selected tens magnet in the connector to operate. In response, the units digit relays UA, UB and OD or EV operate the allotter magnet and the selected units magnet in the connector in a similar way.

Relay SB, operating on the prefix digit, connects ground to conductor CM for operating a call meter which indicates the total number of calls made through the marker In case of 200-line boards, conductors AF, LD, TK, TN, UN, OD, EV and P1—P9 are multipled from the first to the second hundred so that all links in either hundred operate the markers in both hundreds. The trunk selection relays are omitted in the marker of the second hundred.

The marker circuit will be referred to again in connection with the description of the loop dial trunk circuit (Fig. 13) and the link circuit (Figs. 16–17).

The use of the marker circuit presents a number of novel features among which are (1) the provision of one such marker circuit for the whole board, which greatly simplifies the wiring and permits the use of a finder and connector of identical construction; (2) the marker circuit contains the wiring, e. g., for prefix digits which otherwise would have to be included in the link, thus simplifying changes in digit designations which are carried out in the marker; and (3) the single-digit trunk selection is simplified by the marker, which causes simultaneous operation of the tens and units magnets in the connector switch, thereby selecting the trunk.

*The interrupter*

Figure 12:
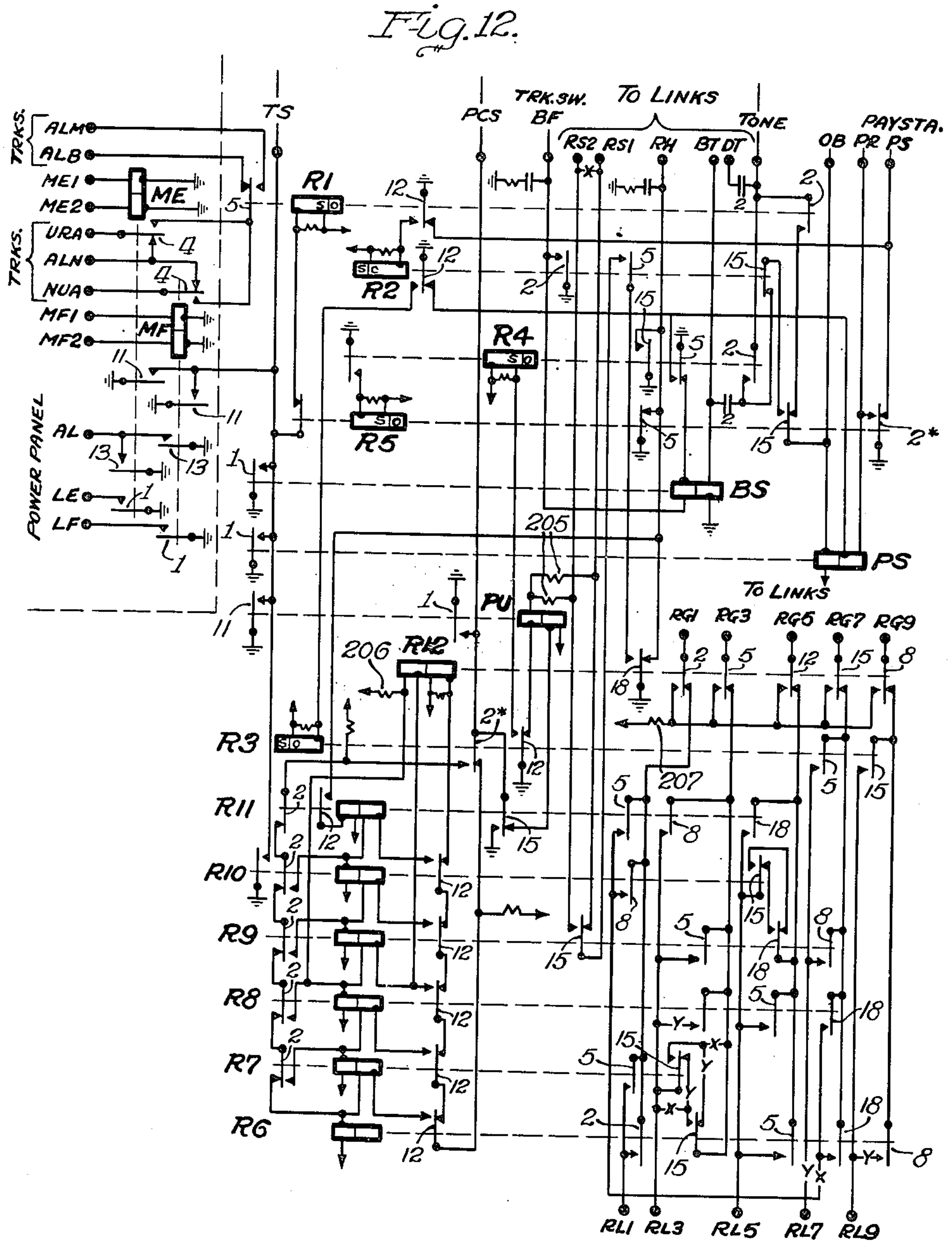
Fig. 12 represents an interrupter circuit furnishing control and supervisory functions.

The interrupter circuit shown in Fig. 12 is a unit which comprises sets of relays constituting a busy interrupter and a ringing interrupter, respectively. The interrupter also furnishes various signalling and supervisory functions. It may be used either with X-wiring for three ringing codes or with Y-wiring for five codes. It also furnishes busy tone at 60 pulses per minute; overflow busy tone at 120 pulses per minute; timing pulses for pay station tone; and alarm flashes at 60 pulses per minute for transmitting alarms over trunks. There are also fuse alarm relays provided for urgent and nonurgent fuse alarms.

The busy interrupter also serves as a driver for the ringing interrupter and its relays operate once per second. The ringing interrupter relays operate once every six seconds. This low rate of operation and the fact that either interrupter runs only when actually needed helps to insure trouble-free operation for long periods of time.

The tone generator is connected to the interrupter over the "tone" conductor. Dial tone is furnished to the links over the conductor DT.

The connections tying the interrupter with the links and with other equipment will presently be brought out in the description of the link circuit shown in Figs. 16–17.

The busy interrupter comprising the relays R1—R5 is started by energizing relay BS from conductor BT connecting with the links and conductor BF leading to the trunk switch, or by energizing relay PS from conductor PR leading to the pay station circuit, and conductor OB leading to the guard circuit. The relays in the circuits from which the interrupter is started will not operate through the high resistance windings of relays BS and PS. Conductor TS (top left of Fig. 12) connects with a power panel (not shown) and leads to contacts and relays which aid in starting the busy interrupter.

Relays BS and PS cause successive operation of relays R1, R2, R3, R4 and R5; i. e., relay BS or PS at contacts B*sm*1 or PS*m*1 connects ground to conductor TS to operate relay R1, which closes contact R1*m*12 to operate relay R2; at contact R2*m*12, relay R2 closes a circuit for R3 which at contact R3*m*12 closes a circuit for relay R4; and the latter relay at R4*m*12 closes a circuit for relay R5. Relay R5 opens the circuit of relay R1, so that relays R1, R2, R3, R4 and R5 successively release. Relay R5 upon releasing starts the cycle of operations over again, and this cycle continues so long as either relay BS or PS is operated. Relays R1—R5 are slow-to-operate, slow-to-release relays, their timing being such that each cycle of operation requires about one second.

Busy tone is supplied by intermittently connecting the "tone" conductor by contact R4*m*2 to conductor BT, giving approximately 60 tone pulses per minute.

Overflow busy tone is supplied when all links are busy. In this case the "tone" conductor is intermittently connected by contacts R1*m*2, R5*b*15, R4*m*2, R2*b*15 and R5*m*15 to conductor OB at the rate of 120 tone pulses per minute. From the conductor OB this tone passes to the units guard where it is connected to conductor OS when all links are busy and a call comes in. From conductor OS the tone is transmitted through a tone coil to the line circuits where it passes through the line relays to the calling line.

Busy flash for trunks is supplied by intermittently connecting ground to conductor BF at contact R2*m*2 at the rate of 60 ground pulses per minute, for use at trunk circuits, to give the operator a visual busy signal by flashing the supervisory lamp. The high resistance winding of relay BS is disconnected from the conductor BF at contact R4*b*5 to insure that the trunk relays operating over the conductor BF release after each ground pulse.

Pay station timing pulses are supplied by applying ground at contact R5*m*2 to conductor PR and removing it from the conductor PS at contact R5*b*2. A moment later R1*b*12 reconnects ground to conductor PS. Nearly a second later, direct ground on conductor PR is opened at contact R5*m*2, and after a brief interval the sequence is repeated. As a result, a brief interruption of ground on conductor PS is followed after a second by an interruption of ground on conductor PR. These interruptions are used for timing purposes in pay station circuits. To insure the release of the pay station relays after direct ground on conductor PR is opened, the high resistance winding of PS is disconnected for a moment by contact R2*b*12 until contact R4*m*5 closes the circuit of relay P*s* again.

The ringing interrupter comprising the relays R6—R12 is started from the links (Figs. 16–17) which connect their ringing start relays to ringing start conductors RS1 or RS2, operating pickup relay PU through the resistor 205. This resistor, in series with the left hand winding of relay PU, prevents operation of the ringing start relays in the links at this time. Relay PU locks over its right hand winding and contact PU*m*1 and R11*b*15; starts the busy interrupter (relays R1—R5) over contact PU*m*11; and operates relay R12 over contacts PU*m*1, R3*b*2 and then over the serially related contacts R6*b*12, R7*b*12, etc., R10*b*12 to the right hand winding of relay R12 and battery. The busy interrupter relays R1—R5 operate and release in succession. While relay R3 is operated, the circuit of relay PU is opened at contact R3*b*12 so that relay PU can operate only at the proper time in case the busy interrupter is already running for other purposes.

The first operation of relay R3 releases relay R12 and operates relay R6 over contacts PU*m*1, R3*m*2 and then over the serially related break contacts 2, namely, contacts R11*b*2, R10*b*2, etc., down to R7*b*2 and left hand winding of relay R6 to battery. The first release of relay R3 operates relay R7 in series with relay R6 over contacts PU*m*1, R3*b*2, R6*m*12, right hand winding of relay R7, left hand winding of relay R6, to battery. The second operation of relay R3 opens the circuit at contact R3*b*2 and releases relay R6, but holds relay R7 over contacts PU*m*1, R3*m*2 and then over the serially related break contacts R11*b*2, R10*b*2, down to R8*b*2 and then over contact R7*m*2 and the left hand winding of relay R7 to battery. The second release of relay R3 then operates relay R8 in series with relay R7, and so forth. In this manner the six relays R6—R11 are operated and released in succession by six operations of relay R3, as shown in the following table:

| Operations of Relay R3 | Relays R6–R12 Operated | | | RH | 3 Codes | | | | 5 Codes | | | | | | |
|---|---|---|---|---|---|---|---|---|---|---|---|---|---|---|---|
| | | | | | RS1 RS2 | RG1 RG3 | RG5 RG7 | RG9 | RS1 | RS2 | RG1 | RG3 | RG5 | RG7 | RG9 |
| | | | | | | 1–4 | 5–8 | 9–0 | | | 1 | 4 | 5 | 8 | 9 |
| | | | R12 | | | | | | | | | | | | |
| 1st Operate | R6 | | | | | | | | | | | | | | |
| 1st Release | R6 | R7 | | | | | | | | | | | | | |
| 2nd Operate | R7 | | | | | | | | | | | | | | |
| 2nd Release | R7 | R8 | | | | | | | | | | | | | |
| 3rd Operate | R8 | | | | | | | | | | | | | | |
| 3rd Release | R8 | R9 | R12 | | | | | | | | | | | | |
| 4th Operate | R9 | | | | | | | | | | | | | | |
| 4th Release | R9 | R10 | | | | | | | | | | | | | |
| 5th Operate | R10 | | | | | | | | | | | | | | |
| 5th Release | R10 | R11 | | | | | | | | | | | | | |
| 6th Operate | R11 | | | | | | | | | | | | | | |
| 6th Release | | | R12 | | | | | | | | 2 | 3 | 6 | 7 | 0 |

After the third release of relay R3, relay R12 operates in parallel with the right hand winding of relay R9 and releases on the fourth operation of relay R3. The left hand winding of relay R8, through which relays R9 and R12 operate, is mounted by the resistance 206 to provide sufficient operating current for relays R9 and R12.

On the fifth release of relay R3, the circuit of relay PU is opened at contact R11*b*15, but ground for running both interrupters is maintained over contacts R10*m*5 and R11*m*15. Ground through contact R10*m*5 is opened after the sixth operation of relay R3, stopping the busy interrupter.

After the sixth release of relay R3, the relay R11 holds for an interval over contacts R11*m*12, R4*m*15, and relay R12 operates over contacts R11*m*15, R6*b*2, R7*b*2, etc. When contact R4*m*15 opens, relay R11 releases and restores relay R12. Release of relay R11 stops the ringing interrupter unless relay PU is operated again from the links for the next ring, if required.

Ground through contact PU*m*1 or contact R11*m*15 starts a standby ringing converter over the conductor PCS in case of power failure.

The ringing codes are furnished in the following manner: With X-wiring for three codes, relay R12 transmits a ground pulse over contacts R12*m*18, R2*m*5, R9*b*15 to conductors RS1 and RS2 before the first operation of relay R3. The conductors RS1 and RS2 connect with the link circuits. This pulse operates the ringing start relays in the links. Relay R12, operating after the third release of relay R3, interrupts ground on ringing hold lead conductors RH when relay R4 releases. This restores the ringing start relays in the links.

With Y-wiring for five codes, conductors RS1 and RS2, which lead to the links, are separated and for parties 1, 4, 5, 8, 9 the ringing start relays in the links function as described. For ringing parties 2, 3, 6, 7, 0 relay R12 transmits a ground pulse over contacts R12*m*18, R2*m*5, R9*m*15 and conductor RS2 after the third release of R2, and interrupts ground on conductor RH when it operates after the sixth release of relay R3. These parties therefore ring during the second half of the ringing sequence.

Ringing current from ringing lamps (not shown) is connected by the interrupter relays to the links over ringing generator conductors RG1—RG9, as shown in the table above. Relay R12 transfers conductors RG1—RG9 to battery through the resistance 207 to discharge the ringing condensers on the line before ground on conductor RH is opened to restore the ringing start relays in the links.

Certain relay windings are shunted by resistors for spark protection. Other circuits are also provided with spark-absorbing resistors when necessary to insure trouble-free operation.

The function of the fuse alarm shown in the upper left hand corner of Fig. 12 may be explained for the sake of completeness. The alarm equipment is not shown in the drawing, but its function will be easily understood. The alarm bus of link and line fuses in each bay of the switchboard is connected to a lamp on the fuse panel and over conductor MF1 to a winding of relay MF, the alarm bus of all other fuses to another lamp on the fuse panel and over conductor ME1 to a winding of relay ME. The second windings of relays MF and ME are for connection to the second hundred over conductors MF2 and ME2.

When a fuse blows, it lights its fuse panel lamp and operates relay MF or ME which in turn closes a circuit for lighting an alarm lamp over conductors LF or LE; starts an alarm buzzer over conductor AL; starts the busy interrupter over contact MF*m*11 or ME*m*11; and transfers "nonurgent" alarm conductor NUA or "urgent" alarm conductor URA from the terminal ALN to terminal ALB or ALM over contacts R1*b*5 or R1*m*5. By means of appropriate connections to a trunk circuit conductor NUA or URA is then intermittently interrupted by relay R1 for the purpose of transmitting the alarm over the trunk to an associated office. It will thus be seen that the relay R1, which is one in the group of busy interrupter relays, also functions for giving alarm signals to an attendant.

The novel features included in the interrupter circuit discussed above reside in the provision of a set of relays which furnish the control for the transmission of a plurality of distinctive signals including transmission of line and link busy tones, busy flash for trunks, and pay station timing pulses, and also reside in using such relays to act as a driver for another set of relays which control ringing, including code ringing on lines.

*The loop dial trunk line*

Figure 13:
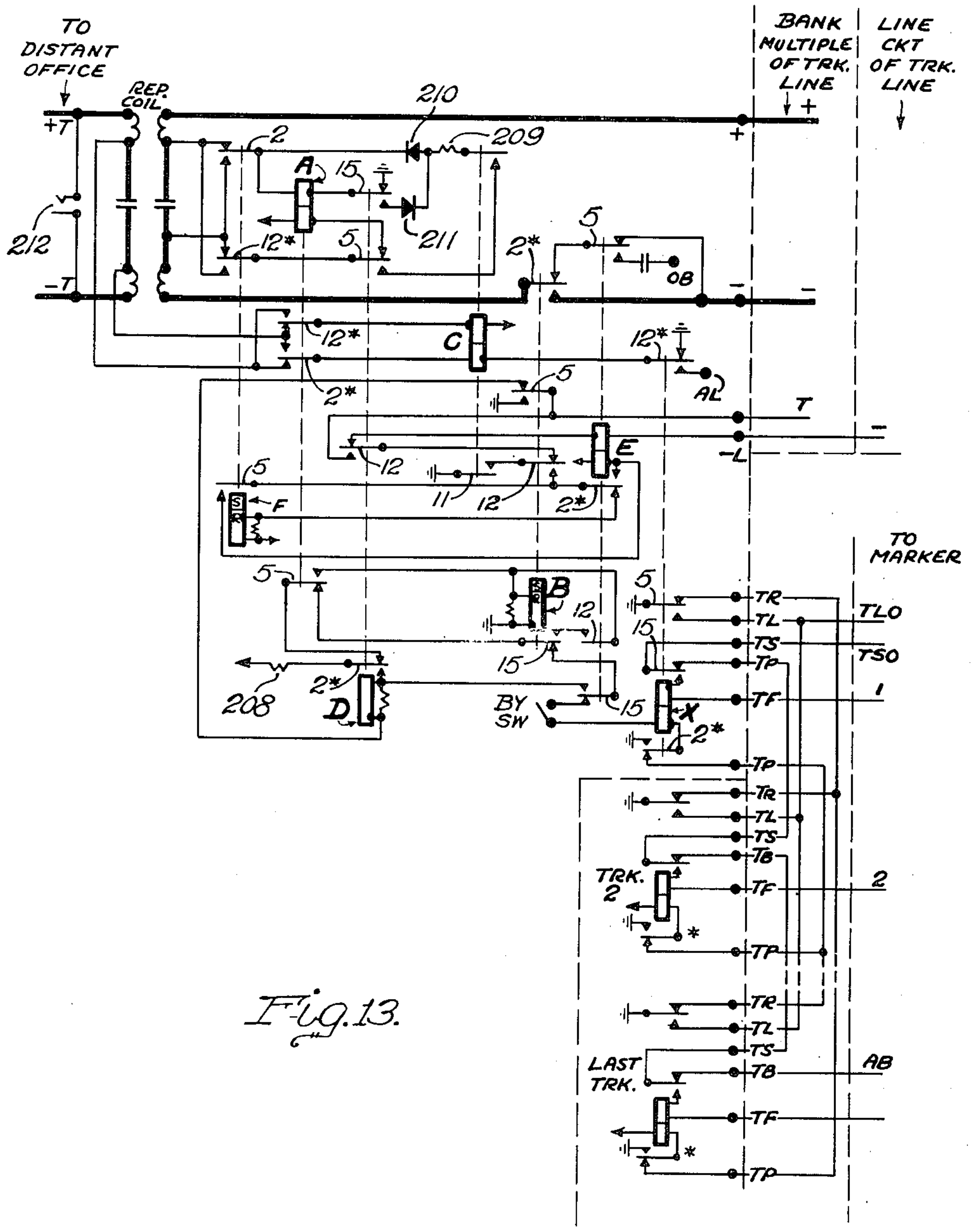
Fig. 13 illustrates an example of a loop dial trunk line.

An example of a loop dial trunk line for trunks to a manual office is shown in Fig. 13. Incoming and outgoing calls on this trunk are handled over the regular links shown in Figs. 16–17.

The line and test conductors at the top of the drawings extend to the right and terminate in conductor bars in the bank multiple of the switches in a similar manner as the line and test conductors of the line circuit, Fig. 9, terminate in corresponding conductor bars in the line bank multiple. It is assumed that the trunk group is reached by dialling "0." The line conductors at the top and left of the drawing connect with the distant office. Each trunk line is provided with a relay X which, in conjunction with similar relays X of other trunks, controls the sequence in which idle trunks are taken into use. The contacts of the X-relay of the first trunk line are serially interconnected with similar contacts of X-relays of other trunk lines, as shown in the drawing, when all trunks are busy. This removes ground from the TL0 conductor and connects conductor TS0 to the marker conductor AB over interconnected contacts controlled by the X-relays of all the trunks in the group. The result is that the link attempting a call to a group of trunks will return busy tone to the calling party. The conductors 1 and 2, together with similar conductors terminating in X-relays between the X-relay for trunk 2 and the last trunk, connect with correspondingly marked contacts in the allotter bank multiple shown in the marker circuit, Fig. 11. The conductor —L extending from the upper winding of relay E to the right connects with the line relay of a line circuit associated with the trunk line.

In case of incoming calls from the distant office, the distant operator places a low resistance bridge across the line, operating relay C which closes a circuit for relay E from ground over contacts CM11, Bb12, Db12, upper winding of relay E, conductor —L to the line relay in the line circuit associated with the trunk. Relay E and the line relay operate. Relay E opens the connection from the lower line conductor at contact Eb5 to prevent premature operation of relay A from functions in the link, and connects overflow busy tone from conductor OB over contact Em5 to the line. On normal incoming calls relay E operates only long enough to land the call in an idle link. If all links are busy, E stays operated and transmits overflow busy tone to the distant office. Relay E also prepares a circuit for relay D from battery through resistance 208, contacts Db2, Ab5, Bb15, Em15, winding of relay D, contact Bb5 to the test conductor T. The line relay causes the call to land on an idle link, and relay D operates from ground placed on the test wire by the link when it lands.

Relay D at contact Db2 releases relay E and the line relay. Release of relay E closes the line at contact Eb5 and disconnects the overflow busy tone. Relay E is thus only momentarily operated but, as stated before, if the links are busy, overflow busy tone will be transmitted to the distant office. Relay D, upon operation, holds over contact Dm2. Ground over contacts Cm11, Bb12 and Dm12 is connected to the test wire T to disable the time disconnect feature in the link which will be presently described. In other words, on ordinary calls the system provides a time disconnect feature which, however, is ineffective on trunk calls. Relay D also disconnects relay A from battery and ground at contacts Db5 and Db15 and closes a path from one line branch over contacts Eb5, Bb2, Fb12, Dm5, Cm1, resistor 209, then over rectifier 210 and contact Fb2 to the other branch of the line for holding the link over contact Cm1. Subsequent functions in the line are the same as on local calls. Dial pulses from the distant office are received by relay C and repeated by contact Cm1. Relays E and D open the circuit of relay X at Eb15 and Db2, releasing relay X, if operated at that time, to make the trunk busy. The operation of the relays X will be presently described more in detail.

Supervision of incoming calls, with relays C and D operated, is provided as follows: When the called party answers, the link reverses battery on the line, operating relay A over contact Fb2, upper winding of relay A, contact Dm15, rectifier 211, resistor 209, contact Cm1, Dm5, Fb12, Bb2 and Eb5. Relay A reverses the battery on the trunk at its contacts Am12 and Am2, giving "off hook" supervision to the distant office. When the called party hangs up, the link reverses the battery to normal. This releases relay A which returns the battery on the trunk to normal and gives "on hook" supervision to the distant office.

The release of an incoming call (with relays C and D operated) is accomplished by the removal of the low resistance bridge across the trunk at the distant office. This releases relay C and restores the link by opening contact Cm1. Release of the link removes ground from test wire T, which restores the trunk to normal by releasing relay D. Relay A may now operate to make the trunk available to outgoing calls, as will be presently discussed.

In connection with outgoing calls (to the distant office) the following operations have to be considered:

To select an idle trunk after "0" is dialled, the link causes the marker (Fig. 11) to place ground through resistor 203 (Fig. 11) on the allotter multiple bar 10 and direct ground on lead TS0. With X (Fig. 13) operated, the trunk being assumed to be idle, ground on TS0 passes through contact Xm15 and the upper winding of the X-relay over the marker terminal 1 to the allotter multiple bar 1. These two ground connections operate the tens and units magnets 1 and 10, respectively, in the connector (Fig. 17). These magnets lock to the same holding conductor in the link, thereby connecting the resistor 203 (Fig. 11) across the upper winding of relay X. The resistor 203 is necessary to avoid short-circuiting the upper winding of relay X.

Ground furnished over contact Xm5 to conductor TL0 is connected by the marker to a link relay, which cuts the calling line through the link to the connector. Operation of the tens magnet 10 and units magnet 1 in the connector (Fig. 17) completes the connection from the calling line to the trunk, where relay A operates over the calling line loop from battery through the lower winding of relay A, contacts Db5, Fb12, Bb2, Eb5, over the link and line loop to contact Fb2, upper winding of relay A and contact Db15 to ground.

Relay A, upon energizing, opens the locking circuit of relay X at contact Ab5 and operates relay B over resistor 208 and contacts Db2, Am5 to winding of relay B and to ground. Relay B connects ground over contact Bm5 to the test wire T to hold the link, and opens another point in the locking circuit of relay X at contact Bb15. With the locking circuit of relay X open, X holds over its upper winding in series with the units magnet in the connector until the marker releases and removes ground from conductor TS0. Then X releases, shifting the circuit of conductor TS0 over contact Xb15 to the next trunk. Holding of relay X over the units magnet circuit prevents premature shift of units selection conductor TS0.

The operation of relay A also reverses the battery on the trunk at its contact Am12 and Am2, initiating the call at the distant office.

In answering the call, with relays A and B operated, the distant office places a low resistance bridge across the trunk, operating relay C. Relay C operates relay F over contact Cm11, Bm12 and Eb2. Relay F reverses the battery on the calling line at its contacts Fm2 and Fm12 and operates relay E over contacts Cm11, Bm12 and Fm5. Relay E locks over contact Cm11, Bm12 and Em2, and opens the circuit of relay F at contact Eb2. The slow-to-release relay F restores after a brief delay and reverses the battery on the calling line back to normal. This momentary battery reversal serves to start a spurt of tone on pay station lines. The tone may be repeated by disconnecting for a moment at the distant office, which releases relay E, lets relay F operates and then operates relay E and releases F again. With relay B operated, the minus line is kept closed over Bm2 to prevent opening by contact Eb5.

When release of an outgoing call is initiated by the calling party hanging up, and with relays A, B, C and E operated, relay E releases and returns the battery on the trunk to normal, giving the distant office "on hook" supervision. Relay B is held over contacts Em12, Bm15, Ab5 and Db2, keeping ground on the test wire T to hold the link. To disconnect, the distant office opens the low resistance bridge across the trunk, releasing relays C, E and B in turn. This removes ground from the test wire T and releases the link. The trunk is now restored to normal, and relay X may operate in a manner as will now be described.

When a trunk is engaged, either by an incoming or by an outgoing call, relay X releases as already described, routing the next call to the next idle trunk. When the last trunk in the group is seized, its relay X releases and re-operates relays X of all preceding trunks which are idle at the time, over conductor TR of the last trunk and conductors TP of all other trunks. The relays X then lock over contact Xm2, lower winding of X, switch BY—SW, contact Eb15, Bb15, Ab5, Db2 and resistor 208 to battery. Relay X of the last trunk is re-operated over its own conductor TP and conductor TR of any other busy trunk. Successive calls will therefore engage idle trunks one after the other, except while the last trunk is busy.

The busy switch BY—SW is manually operated and is normally in closed position. When opened, the switch opens the circuit of relay X and makes the trunk busy to outgoing calls. If the trunk fuse blows, relay X releases or, if released, cannot operate again, thus making the trunk busy. Shorting clips inserted on the jack of the trunk relay unit in the board connect jack springs C11 to C12 and S11 to S12 (Fig. 10) when the trunk unit is taken out. This automatically carries the selection circuits through to the next trunks.

Busy tone is returned to the calling party by the link, if an attempt is made to reach a trunk by dialling its four-digit line number instead of the proper single-digit trunk number. This is done by busying the trunk by grounding the test wire T. With the trunk idle, no battery is connected to its test wire T.

Each trunk has a test jack 212 for making and answering incoming and outgoing calls.

Alarms are transmitted over trunks as follows: The terminal AL of the trunk is connected to ground when alarm transmission is not required. For the purpose of transmitting alarms, terminal AL is connected to ringing interrupter terminal URA or NUA and interrupter terminal ALN is grounded (Fig. 12). In case of an alarm, ground through terminal AL is interrupted intermittently, thereby causing alarm relays at the distant office to function when the trunk is idle. The intermittent interruptions do not interfere with the normal use of the trunk on incoming or outgoing calls.

The novel features included in the trunk circuit deal with the trunk selection and with supervision, of which the momentary reversal of battery on trunk calls to start a spurt of tone on pay station lines may be mentioned as an example. On normal local calls there is a time disconnect feature provided in the link, as will be presently described. This feature is not effective on trunk calls.

*Miscellaneous circuits*

Fig. 14 shows a lockout relay circuit for control operations including (1) releasing a link and placing the calling line on lockout, if a local call is not answered within a certain time interval; and (2) in releasing a link, in accordance with a time disconnect feature to limit the duration of local calls to six minutes. These lockout and time disconnect features are not operative on trunk calls.

The circuit comprises four relays LA, LB, LC and LD. One contact of each of the relays LB, LD, LC is connected to a terminal "LT" in the respective links. The five contacts controlled by relay LB thus terminate in links 1–5, respectively; the four contacts controlled by relay LC terminate in links 6–9, respectively; and the five contacts controlled by relay LD terminate in links 10–14, respectively. The conductor LC is connected with a timer which delivers impulses at three-minute intervals. The conductor LS connects with correspondingly marked terminals in the fourteen links.

Pulses delivered by the timer at three-minute intervals to the conductor LC operate relay LB which in turn operates relays LC, LD and LA over obvious circuits. Ground on the conductors LT to each of the links is opened, while relays LB, LC and LD are operated. After they release, a ground impulse is transmitted to the links over conductor LS until slow-to-release relay LA restores following relay LC. The ground pulse on conductor LS operates a lockout timing relay in the link, and, if this relay remains operated until the next timer impulse opens ground on conductors LT, the link is released.

The timer (not shown) which applies pulses at three-minute intervals to the terminal LC comprises a synchronous motor which drives a cam at ⅓ R. P. M.; that is, the cam makes one revolution in three minutes. The cam closes one cam contact once per revolution, or at three-minute intervals, and another cam contact, 20 seconds before the first, closes, and again just after the latter closes. The three-minute contact connects ground to the conductor LC for lockout timing purposes.

In case of power failure, a first relay operates and opens the circuit of the three-minute contact, and a second relay is caused to operate on the charging current of a condenser, transmitting a timing pulse to conductor LC, the second relay also actuating a third relay. The second relay releases when the charging current of the condenser dies down after a second or so, and the condenser discharges slowly through the high resistance winding of the third relay, holding it operated. After a time interval of about a minute, the condenser is discharged and the third relay releases, starting the cycle of operation again.

Pulses are now delivered to the conductor LC at intervals of one to two minutes instead of the normal three minutes. At times of power failure this speeds up the lockout functions and reduces the battery drain due to permanent lines seizing links.

The provision of a timer for delivering impulses to the conductor LC in conjunction with means for generating timing impulses in case of power failure is believed to be a desired innovation.

It may be noted here that time disconnect pulses are delivered to the links over a conductor TD (Fig. 16, left side) which are generated in a unit operating in conjunction with the lockout relays shown in Fig. 14. After each timing impulse delivered to conductor LS, a first relay operates and actuates a second relay. When ground on conductor LS is opened, the first and second relays release successively, thereby transmitting a ground pulse to the conductor TD in the links for disconnect timing. The tone cam of the timing motor connects ground through a third relay to conductor TD twenty seconds before and again a few seconds before each lockout timing pulse. This ground on conductor TD operates a relay in the link, which connects busy tone to the line as a disconnect warning. The third relay starts the busy tone interrupter.

In case of power failure, a relay operates and opens conductor TD to disable the line disconnect feature because the standby timer comprising the two relays mentioned before in connection with the description of the generation and delivery of lockout timing pulses, transmits pulses at one to two-minute intervals and would operate the time disconnect feature too fast.

It may also be mentioned here that the dial tone delivered to the link (conductor DT at the top of Fig. 17) is controlled by one of the cams of the cam motor which controls the transmission of the pulses to the conductor LC of the lockout timing relays.

Fig. 15 shows a pay station control circuit which is connected between the station and the line circuit by jumper wires.

On calls from the pay station, current passes from the lower line conductor 215 through rectifier 216 and contact IA*b*2 to the lower line conductor 217 leading to the line circuit, until battery on the line is reversed when the call is answered. Then current from the line conductor 217 over the left hand winding of relay IA and rectifier 218 to the lower line conductor 215 operates relay IA, which locks over its right hand winding and contacts IA*m*11 and IB*b*2 to ground on the test wire TI of the pay station line. Contact IA*m*2 shunts the left hand winding of relay IA, and at contact IA*b*2 the shunt for the right hand winding of relay IB is opened. On local calls relay IA releases when the pay station hangs up, removing ground from the test wire TI.

On a call to a trunk, the battery on the line is momentarily reversed, as previously described in connection with the loop dial trunk circuit (Fig. 13), and then returned to normal when the operator answers. Relay IA operates and locks on the battery reversal, as described. When the line is returned to normal, current from the lower line conductor 215 through rectifier 216 and right hand winding of relay IB to the line conductor 217 operates relay IB, which locks over contact IB*m*11 to conductor PR. This conductor and also the UT and PS conductors shown in the drawing terminate in the interrupter circuit shown in Fig. 12. Relay IB applies tone to the line over contact IB*m*13 and transfers the locking circuit of relay IA from the test wire TI to conductor PS. Locking relay IB to the conductor PR starts the busy interrupter (Fig. 12) which removes ground from conductor PS and connects ground to conductor PR for nearly a second. Removal of ground from PS releases relay IA which shunts the right hand winding of relay IB, but IB holds over conductor PR until the interrupter opens ground on PR a second later. The operator receives tone so long as relay IB is operated. If she wishes to repeat the tone, she disconnects for a moment, which starts the sequence of operations over again.

The coaction of the apparatus and the circuit units explained in the foregoing description, in a community automatic exchange or C. A. X, will become apparent from the description of the C. A. X link which is presented below with reference to Figs. 16–18. A C. A. X system has been chosen for disclosure because of the diversified requirements which in many respects exceed those of larger systems.

*The C. A. X link*

Figs. 16–17, when placed side by side with conductors 220—252 at the right of Fig. 16 in alignment with corresponding conductors at the left of Fig. 17, shows the link circuit which is individual to a finder and associated connector.

The letters and numerals on top of the two drawings designate relays and magnets, respectively, which are shown in the circuits on corresponding vertical lines underneath the various designations. Two additional relays G and H are indicated at the bottom of Fig. 16, each separately indicated by its corresponding letter.

The principal interconnections between the link and the marker shown in Fig. 11 are the terminals AF, LD, UN, etc., through to P3 and P7 at the bottom of the two drawings which are connected with corresponding terminals in the marker circuit, Fig. 11. The interconnections between the link and the interrupter circuit shown in Fig. 12 are similarly indicated at the top and near the bottom of Fig. 17 and also, in case of the terminal TD, at the left of Fig. 16. The link, as shown at the bottom left side of Fig. 16, also has terminals interconnected with correspondingly marked terminals in the units guard, Fig. 10; and also terminals LS and LT leading to the lockout relay circuit, Fig. 14.

A finder is individual to the link, comprising a units and a tens magnet 1 and 10, respectively, as shown at the left of Fig. 16. It is assumed that these two magnets belong to the tens group 10 and to the units group, respectively. Accordingly, these magnets may be the ones having the tens coil 54 and the units coil 85, respectively, as shown in Figs. 1 and 2–5. The allotter magnet AR having the coil 127 corresponds to the allotter magnet having the coil similarly marked by numeral 127 in Figs. 1 and 2–5. A similar allotter magnet 127*a* is provided in the corresponding finder of the second hundred. The tens magnet 10 having the coil 54 operates ten sets of contact fingers, each set comprising three fingers, among them the set of contact fingers 260—261—262 which connect the three line and test bars 264—265—266 of a particular line in the line bank multiple with the associated bank springs 267—268—269, respectively, thus extending the three bars 264—265—266 to the three eleventh contact fingers 270—271—272. The latter correspond in this case to the eleventh contact fingers 96—97—98 shown in Figs. 1 and 2–5. These three eleventh contact fingers are operated by the units magnet 1 having the coil 85 to extend the line and test bars 264—265—266 of a calling line to the bus conductors 2, 3, 4 corresponding to bus conductors 102, 103, 104 of Figs. 1 and 2–5 which terminate in the link.

The allotter AR, having the magnet 127, operates ten sets of contact fingers each comprising two fingers, among them the two-contact fingers 114—115, to make contact with the tens and units allotter bars 10 and 1, respectively, in the allotter banks multiple, thereby causing operation of the tens and units coils 54 and 85.

The tens magnet 10, having the coil 54, also operates a holding contact 273, and the units magnet 1, having the coil 85, operates a similar holding contact 274.

The connector switch at the extreme right of Fig. 17 is exactly like the finder switch and its element which correspond to like elements in the finder, will be easily identified without further discussion. It will be convenient to place the line circuit, Fig. 9, at the left of Fig. 16 so as to follow the explanations which will presently be given with respect to the circuits. A summary of the system, of the relay functions and of the link operation will be given first, to support the understanding of specific functions which will be described later on.

Local stations have four-digit numbers. A single digit is dialled for trunks. The first or prefix digit selects the local 100-line group of a trunk; the second and third, or tens and units digits select the line; and the fourth or party digit selects the party on the line.

The relays shown in Figs. 16–17 have the functions briefly summarized below:

X operates to prepare link to accept calls; releases to make link busy;
A feeds battery to calling line; receives dial pulses;
B is slow-to-release an holds link under control of A;
C releases after each digit to initiate selection;
D operates when call is answered; feeds battery to called line;
E makes busy test after party digit; connects through to called line;
F operates after prefix digit to switch selection from 1st to 2nd hundred; releases after units digit; operates after party digit to start ringing;
G operates in link guard circuit after first three digits to seize marker;
H operates with G to furnish additional contacts for connection to marker;
K operates on timing pulse after link is seized for lockout timing; after call is answered for disconnect timing;
L operates on trunk calls after prefix digit to cut link through to trunk;
S follows C to allow time for selections; trips ring during ringing period; operates after call is answered to apply disconnect warning tone;
T operates after prefix digit to switch to tens selection; releases after units digit to switch to party selection; operates for disconnect timing;
U operates after tens digit to switch to units selection; and
1–6 count dial pulses to control selections.

The various operations will now be described in general manner and presently more in detail.

Incoming calls engage the links in rotation, first seizing links 1, 3, 5, etc., and then links 2, 4, 6, etc. See also Figs. 6 and 7. After all links have been engaged one after the other, relays X are operated and locked in all links not engaged at that time. The next call is then accepted by the first link in which X is operated.

The line relay of the calling line, which may be the one shown in Fig. 9, causes the tens and units guard circuits (Fig. 10) to apply ground to one tens bar and one units bar in the allotter bank multiple in a manner already described in detail with reference to Figs. 9 and 10. The allotter magnet AR having the coil 127 in the finder switch and relay A in the link (Fig. 16) now operate. The allotter magnet actuates the contact fingers 114 and 115 to connect the finder tens and units magnets 54 and 85 to the grounded allotter bars which are assumed to be the bars 1 and 10, thereby causing actuation of these magnets 54 and 85 and consequently operation of the contact fingers 260, 261, 262 (tens magnet 54) and 270, 271, 272 (units magnet 85). The calling line circuit (Fig. 9) is now connected with the link.

Relay A operates relays B, C and S in turn, applying ground to the test wire T (266) of the calling line and operating its cutoff relay (60 in Fig. 9) which disengages the tens and units guard circuits (Fig. 10) as already described before. This releases X, making the link busy and routing the next call to other links.

Relay A is now connected by relay B through the finder switch (extreme left of Fig. 16) to the calling line ready to receive dial pulses. Dial tone is applied when relay B operates. The dial pulses received by A are counted by relays 1–6. When the pulses stop, C releases, operating G and H which act as a guard circuit to connect the link to the common marker (Fig. 11) without interference from other links. The marker interprets the information dialled into the counting relays 1–6, and on a local call causes link relay T to operate, which disconnects dial tone. Relay S releases shortly after C, restoring G, H and the counting relays 1–6. When the latter restore, C and S operate again, ready for the next digit.

The next dial pulses are again counted by relays 1–6. Then C releases, engaging the marker through G and H. This time, T being operated, the marker is directed to cause the operation of the allotter AR and of a tens magnet in the connector switch (extreme right of Fig. 17) which locks through U. Then S, G, H and the counting relays 1–6 release and C, S and U operate one after the other.

After the next digit is dialled, the marker is again engaged when C releases. This time, T and U being operated, the marker is directed to cause the operation of the allotter AR and of a units magnet in the connector switch. The line is now selected, but no connection made to it. Next S, G, H and the counting relays 1–6 release, and C and S operate again. With U operated and S released, the circuit of T is opened when C operates, causing T to release.

With T released and U operated, the next digit does not engage the marker, and counting relays 1–6 remain operated after dialling. When C releases, a busy test of the called line is made. If it is not busy, E operates from battery through the cutoff relay, completes the connection to the called line and connects F to the ringing interrupter (Fig. 12) to start ringing. F operates at the start of each ringing period and releases at its end. Counting relays 3–6 select the proper ringing current to ring the called party.

If the call is answered during the silent period, D operates, releasing the counting relays 1–6. Answering during the ringing causes S to operate, which trips F and thereby allows D to operate. When the calling party hangs up, A and, a short while later, B release, restoring the entire link to normal, except that X is not re-operated until all links have been engaged in rotation.

If the called line is busy, E is not operated by the time S releases following C. No connection is made to the called line, and busy tone is applied to the calling line, due to C and E remaining released. When the calling party hangs up, A and B release and ground is applied briefly to test wire T of the called line to test for reverting call. If the called line is not the same as the calling line, this test ground has no effect and the link releases. On a reverting call to a party on the same line, test wire T of calling and called line are the same, allowing the reverting call test ground to return through the finder switch to hold the link and to operate E, which starts the ringing. When the reverting call is answered, operation of D releases the entire link and puts the line on lockout. Talking battery is then supplied to the line over the line circuit.

Trunks may be connected to regular line circuits, or they may be terminated on individual switches per trunk. In the first case, incoming and outgoing trunk calls are handled by the regular links; in the latter case incoming trunk calls do not engage the regular links, and outgoing trunk calls need a link only for the time it takes to dial the single-digit trunk number.

On calls to trunks terminating on line circuits, dialling the trunk digit directs the marker to cause selection of an idle trunk by operating the proper tens and units magnet in the connector switch and to operate link relay L. This connects A, cuts the calling line through the link directly to the trunk, and releases all link relays except L and U. The link and relay L are held from the trunk over connector test wire T.

In case of trunks terminating on individual trunk switches, the marker is caused to operate an allotter magnet AR (magnet 127) in the finder switch of the link and also in an idle trunk switch. With both allotter magnets AR operated, locking ground of the operated tens and units magnets in the finder switch is carried through the allotter bank multiple to the same tens and units magnets in the trunk switch, operating these magnets and thereby causing the trunk switch to pick up the calling line. At the same time the marker operates link relay L, which opens the circuit of A and thereby causes the entire link to release, since no selection has been made in the connector switch to hold L.

If all trunks in the called group are busy, the marker is caused to operate a tens magnet in the connector switch, but not the units magnet or L. The tens magnet releases through U which operates, preventing further dial pulses from having any effect and aplying busy tone to the line. The same functions take place on dialling "1" or any other unassigned prefix numeral.

So long as a link is engaged, either B or U is operated. This connects K to timing lead LS (left side, Fig. 16) over which a ground pulse is transmitted every three minutes from the lockout relays, Fig. 14. K operates on this pulse and locks. K is released together with T after the units digit, to re-start the timing period before ringing starts. With K operated, ground is supplied to the link over timing conductor LT (left side, Fig. 16). On the next timing pulse three minutes later, this ground is interrupted by the timing circuit, causing the link to release and putting the calling line on lockout. Answering the call operates D, which opens the locking circuit of K so that the link cannot be locked out so long as the parties are talking. On a reverting call, if neither party answers after the calling party has hung up, K operates on the first timing pulse received and the link is released by the next pulse three minutes later.

Where time disconnect on local calls is used, D operates when the call is answered and releases K, if operated at the time. This prepares a circuit from timing lead TD (left side, Fig. 16) to relay T, causing T to operate on the next timing pulse. T in turn clears a new locking circuit for K, permitting K to lock after operating on the next timing pulse three minutes later. With K remaining operated, the link is released as described above, after another three minutes. Twenty seconds before releasing and again just before releasing, S is operated by timing pulse on conductor DT (top of Fig. 17) to apply busy tone to the line for a short period as a warning to the talking subscribers that they will be disconnected.

On outgoing calls to trunks terminating on lines, L keeps the locking circuit of K open so that the link cannot be released by the timing circuit. Incoming calls from these trunks use the link in the same manner as local calls, permitting T, K and S to operate. However, ground furnished from the trunk over finder test wire T holds the link when the timing circuit interrupts the ground on lead LT. This prevents time disconnect on trunk calls, although the warning tone is applied to the line.

In exchanges where time disconnect is not desired, the conductor TD is not connected to the timing circuit.

The dial pulses are counted by the counting relays 1-6 which act in pairs of two. Relay pair 1—2 operates and releases in response to alternate dial pulses, or five times for ten dial pulses. Relay pair 3—4 in turn acts in response to alternate operations of pair 1—2, or three times for five operations of 1—2. Finally, relay pair 5—6 functions in response to alternate operations of 3—4, but relay 6 remains locked up, thus giving only one operation of 5—6 for three operations of 3—4.

In this manner ten distinct relay combinations are obtained, one for each of the ten dial pulses. The table shown in Fig. 18 will help to make the counting operations clear.

The above indicated operations will now be explained more in detail.

The link is prepared for accepting calls in the following manner: When all links have been engaged one after the other, relays X in all links have been released. This causes the units guard to apply ground to reset conductor RS (bottom left, Fig. 16), operating X in all idle links from ground on RS over X*b*2, lower winding of X, switch BY—SW, contacts B*b*7, U*b*12 and resistor 280, to battery. X locks over its lower winding from ground on its contact X*m*2, BY—SW switch, and contacts B*b*7, U*b*12 and resistor 280 to battery, preparing the link to accept calls.

Relay X is thus operated when a call lands. When the call comes in, the line relay LR in the line circuit, Fig. 9, causes the tens and units guard to apply ground to conductor F1 (Fig. 16, lower left) and to a tens and units bar in the allotter bank multiple corresponding to the tens and units digit of the calling line. Ground on conductor F1 operates finder-allotter magnet AR (magnet 127) over contact X*m*12 and conductor 281 to the allotter magnet 127. Ground is also aplied to relay A over contact X*m*5, upper winding of relay X, and lower winding of relay A, to battery.

Energization of the allotter magnet 127 connects the allotter bank multiple to the ten tens magnets and the ten units coils in the finder switch. Since only the tens and units bars corresponding to the calling line are grounded in the allotter bank, only the tens and units magnets required to select the calling line are operated in the finder switch. These magnets are assumed to be the coils 54 and 85 (left side, Fig. 16). These magnets operate contact fingers 260—261—262 and 270—271—272, respectively, thus extending the calling line to the finder leads plus F, minus F and TF.

Meanwhile relay B operated over contact AM1 in an obvious circuit. B applies ground from contact K*b*5, over conductors 244 and 282, contact B*m*14 and over resistor 283 to the finder locking conductor LKF, locking the operated tens and units coils over their actuated contacts 273—274, respectively. B also connects ground from contact K*b*5 over conductors 244 and 282 and contact B*m*4 to the conductor TF which is connected by finder contact fingers 272 and 262 to the test wire of the calling line, causing the cutoff relay CO in the line circuit Fig. 9 to operate. Contact B*b*7 opens the circuit of the lower winding of relay X, but X holds from ground on conductor F1 over contact X*m*5, upper winding of relay X and lower winding of relay A.

Upon actuating, the cutoff relay CO in the line circuit (Fig. 9) releases the tens and units guard (Fig. 10) at its contact CO*b*2 in a manner described in detail with reference to Figs. 9 and 10, thus causing removal of ground from the conductor F1 and from the allotter bank bars. Relay X releases, transferring the circuit of the conductor F1 over X*b*5 and X*b*12 to the next link so that subsequent calls are routed to other links. To provide maximum dependability, this circuit through the links is carried through twin contacts X*b*5 and X*b*12 in parallel. Relay A is now held over the calling line loop from battery through the lower winding of relay A, contacts B*m*11, D*b*12, L*b*15 over the finder switch and line loop to L*b*12, D*b*2, B*m*1 and the upper winding of relay A to ground.

In the meantime relay B has operated relay C from battery through resistor 285, counting relay contacts 2*b*4, 4*b*4, 6*b*4, 1*b*4, conductor 286, lower winding of relay C, conductor 287, contacts E*b*4, conductor 231, contacts L*b*18, B*m*4, conductors 282 and 244 to contact K*b*5, and ground. Relay C operates relay S from battery over the lower winding of S, conductor 225, contact E*b*7, conductor 290, contact C*m*4, conductor 231 and contacts L*b*18, B*m*4 over conductors 282 and 244 to K*b*5 and ground. Dial tone on conductor DT (top of Fig. 17, between and underneath the letters F and E) is now connected to the line over conductor 221, contact T*b*18, capacitor 291, contact U*b*2, conductor 227, contacts E*b*14, F*b*7, capacitor 292 and contact B*m*11.

The calling line is now connected with the link and the subscriber may dial. Relays A, B, C and S are operated. Each dial pulse releases relay A briefly. During pulsing, relay B holds due to its slow-to-release coil. In detail, the operations for counting ten dial pulses are as follows:

Pulse 1 starts: relay A releases and operates counting relay 1 from battery over the upper winding of relay 1, contact 2*b*14, conductor 235, contact A*b*12, conductor 234, contact C*m*4, conductor 231, contacts L*b*18, B*m*4, conductors 282 and 244, and contact K*b*5 to ground. Relay 1 prepares a locking circuit for itself over its upper winding, its contact 1*m*1, lower winding of counting relay 2, conductor 237, contact S*m*12, conductor 293, contact B*m*4, conductors 282 and 244, and contact K*b*5 to ground. Relay 2 does not operate now, having ground connected to both sides of its lower winding.

Relay 1 and subsequently 2, 4 and 6 open the above described circuit for relay C at contacts 1*b*4, 2*b*4, 4*b*4 or 6*b*4, but relay C is slow to release and holds during pulsing over its upper winding conductor 235 and the circuit including contact A*b*12.

Pulse 1 ends: relay A operates, permitting 2 to operate in series with 1 because ground is removed from one side of the upper winding of relay C by opening contact A*b*12.

Pulse 2 starts: A releases, causing 1 to release by energizing its opposing lower winding over contacts 1*m*11, 2*m*14, conductor 235, A*b*12, conductor 234, C*m*4, conductor 231, contacts L*b*18, B*m*4, conductors 282 and 244, and contact K*b*5 to ground. In releasing, relay 1 opens both of its windings at 1*m*1 and 1*m*11. While A is released, 2 holds over its upper winding, 2*m*14, conductor 235 and the circuit including contacts A*b*12, etc.

Pulse 2 ends: relay A operates, releasing 2 by opening its circuit at A*b*12.

Pulses 3, 5, 7, 9 operate relays 1 and 2 in the same manner as pulse 1, and pulses 4, 6, 8, 0 release them in the same manner as pulse 2.

Counting relays 3 and 4 operate in the same manner, except that they are controlled by contact 2*m*11 instead of A*b*12. The result is that these relays function as shown in the table, Fig. 18. Operations of relays 5 and 6 are controlled in a similar manner by 2*m*11 and 4*m*12 in series, so that 5 operates when both contacts are closed at the start of pulse 3, and 6 when contact 2*m*11 opens at the start of pulse 4; closing of both contacts at the start of pulse 7 releases relay 5, but relay 6 remains locked over its lower winding and contact 6*m*12 until the counting relays are released, thereby holding open the circuit of counting relay 5.

The following sequence of operations results in dialling the prefix digit 3 for local calls, for example, prefix digit 3 in the first hundred. Relays A, B, C, S, 1, 2, 4 and 5 are involved in the operation. After dialling digit "3," counting relays 1, 2, 4, 5 are operated when the pulsing stops. Relay A then stays operated long enough to let relay C release. This relay, upon releasing opens at its contact C*m*4, opens the circuit of S which is slow to release and will stay operated long enough to let a selection take place. In releasing, relay C closes at contact C*b*12 a circuit from battery on conductor GI (left lower corner, Fig. 16) over contacts G*b*4 and H*b*7 through the same contacts in all other links to conductor GO which connects to GS in the units guard (Fig. 10), and from GS through G*b*7, left hand winding of relay G, conductor 295, contact U*b*15, S*m*7, conductor 242, contacts 2*m*1 and 4*m*1 in parallel, contact C*b*12, conductor 244 to K*b*5 and ground. To provide maximum dependability, the circuit through the links is carried through twin contacts G*b*4 and H*b*7 in parallel.

Relay G locks over G*m*4 to battery on conductor GI, operates relay H over an obvious circuit closed by its contact G*m*1 and opens a circuit to the next links at G*b*4—H*b*7 and G*b*7. This prevents operation of G and H in more than one link, thereby insuring that only one link at one time can seize the marker for a selection.

Relay G closes a circuit from the marker conductor OD (bottom of Fig. 17) over contacts 1*m*14, conductor 252, G*m*11, U*b*5 and T*b*4 back to the marker conductor TK (lower right corner, Fig. 16) and applies ground at contact G*m*13 (extreme lower right, Fig. 17) over contacts 3*b*4 and 5*m*4 to the marker conductor P3. This directs the marker (Fig. 11) to make the necessary selections for the prefix 3. In response, the marker applies ground to conductor 1H (left lower corner, Fig. 17), causing relay T to operate over contact H*m*11, conductor 249 and lower winding of relay T to battery. Relay T locks over its lower winding in a circuit from ground on contact K*b*5, conductors 244 and 282, contacts B*m*4 and L*b*18, conductor 231, contacts U*b*8 and T*m*7, then conductor 236, connecting with conductor 249 back to the lower winding of relay T.

Relay S releases now, opening the circuit of G at S*m*7, so that G and H release and make the marker available to other links. The time the marker is engaged is so short that the chance of interference due to two links attempting to seize the marker at the same time is quite remote.

With relay T operated and its contact T*b*7 open, the release of S opens the locking circuit of the counting relays at S*m*12. The counting relays release, allowing relay C to operate again over its lower winding, as described before. Relay C in turn operates S again. Relay T upon operating also disconnects dial tone at contact T*b*18 and at contact T*m*4 transfers the marker circuit from conductor TK to TN in preparation for the tens selection.

Operations resulting from dialling prefix 4 for local calls in the second hundred: Relays A, B, C, S, 5 and 6 are operated. In this case relays 5 and 6 are operated when relay C releases, and G and H operate after pulsing stops. This connects the marker conductor EV (bottom of Fig. 17) to conductor TK (lower right corner, Fig. 16) and applies ground to the marker conductor P3. In response, the marker places ground on conductors 1H and 2H, causing relay F to operate over its lower winding and contact H*m*13, to ground on conductor 2H. Relay F locks over its contact F*m*1, conductor 249, in parallel with relay T. Then relays S, G, H, 5 and 6 release, and relays C and S re-operate as described before. With F operated, the subsequent line selection is transferred from the first to the second hundred over contact F*m*15.

It is assumed that a local call to a pay station requires dialling of prefix 9. Relays A, B, C, S, 1, 2, 3, 6 are operated. When relay C releases and relays G and H operate after pulsing stops, the marker conductor OD (bottom, Fig. 17) is connected over the operated contact 14 of the counting relay 1, conductor 252, contacts G*m*11, U*b*5 and T*b*4 to marker conductor TK, and the marker conductor P9 (bottom, Fig. 17) is connected to ground by way of contact 7 of counting relay 6 in operated position, contact 15 of counting relay 5 in normal position, contact 4 of counting relay 3 in operated position, and contact 13 of relay G in operated position. The marker responds by placing ground on conductor 1H. This operates relay T over contact H*m*11 and conductor 249, lower winding of relay T to battery. The further functions of the link are the same as for dialling prefix 3.

Dialling prefix 9 therefore selects the same lines as prefix 3, making it possible to assign numbers beginning with 9 instead of 3 to pay stations. This helps the long distance operators to recognize calls from pay stations.

Relays A, B, C, S, T, 1, 2 and 3 are operated when the tens digit 1 is dialled in setting up a local call. After pulsing stops, relay C releases and relays G and H operate, connecting the marker conductor OD to TN by way of contact 14 of counting relay 1 in operated position, conductor 252, contacts G*m*11, U*b*5 and T*m*4; and conductor P1 is connected to ground by way of contact 7 of counting relay 6 in normal position, contact 15 of counting relay 5 in normal position, contact 4 of counting relay 3 in operated position, and contact 13 of relay G in operated position, to ground. This directs the marker to place ground on conductor AC (left lower corner, Fig. 17) and on allotter multiple bar 10 in the connector switch, operating allotter magnet AR and the tens magnet 10 in the connector.

Relays S, G, H, 1, 2, 3 and the allotter then release, while the tens magnet 10 of the connector locks over conductor LKC, conductor 240 and contacts U*b*18, T*m*1, S*b*2, B*m*4, conductors 282 and 244 to ground on contact K*b*5. After counting relay 2 releases, relays C and S operate again, opening contact S*b*12 so that the tens magnet 10 of the connector now locks over conductor LKC and the winding of relay U and then over the same circuit involving contact B*m*4, conductors 282 and 244 to ground on contact K*b*5. Slow-to-operate and slow-to-release relay U actuates in series with the tens magnet 10 of the connector, transferring the marker circuit from conductor TN to conductor UN in preparation for the units selection. The operation of relay U is prevented by the shunt through its contact U*b*18, contacts T*m*1, and S*b*12, until after relay S operates in order to have a new locking path prepared for relay T over contact S*m*1 before contact U*b*8 can open.

When a tens digit other than 1 is dialled, the functions are similar except that other counting relays are operated to indicate the numeral dialled to the marker over conductor OD or EV and one of the five conductors P1–P9. As explained before in connection with the description of the marker, numeral 1 is indicated over conductors P1 and OD, numeral 2 over P1 and EV, numeral 3 over P3 and OD, and numeral 4 over P3 and EV, and so forth, conductor OD designating odd and EV even numerals. In response, the marker causes the corresponding tens magnet in the connector switch to operate.

Relays A, B, C, S, T, U, 1, 2 and 3 are operated when the units digit 1 is dialled on local calls. When pulsing stops, relay C releases and relay G operates over contacts T*m*15 and U*m*15 instead of over U*b*15. Then relay H operates and marker conductor OD is connected to conductor UN, and P1 is connected to ground, directing the marker to select units magnet 1. The marker accordingly places ground on conductor AC and on allotter multiple bar 1, operating the connector allotter magnet AR and the connector units magnet 1.

Relays S, G, H, 1, 2, 3 and the allotter magnet then release, while units magnet 1 locks over its own contact, together with tens magnet 10, over the conductor LKC. After the units magnet 1 closes its locking contact, its operating ground coming from the marker momentarily short-circuits relay U until the marker releases, but U is slow to release and holds during this interval.

With relay S released, relay T holds temporarily over

Cb4 instead of Sm1. When relay C operates following the release of 1 and 2 the locking circuit of T is opened at Cb4, causing T to release, since Ub8 and Sm1 are also open. This sequence insures that relay T cannot release until the counting relays are restored. With relay T released, a new locking path for the counting relays is prepared over contact Db5, Tb7, conductor 232, contact Cb4, conductor 231, contacts Lb18, Bm4, conductors 282 and 244, to ground on contact Kb5, which holds these relays operated when relay C releases after the party digit. After the release of relay T, relay S is operated again by relay C. If operated at this time, F releases together with relay T. With relay U operated and T released, the circuit of relay G is opened at contacts Ub15 and Tm15, so that G cannot be operated again.

When a units digit other than 1 is dialled, the marker will operate the corresponding units magnet, as explained above, for the tens digit.

The called line is now selected in the connector switch, and its plus and minus line conductors and test conductor T in the line bank multiple (extreme right of Fig. 17) are connected over the tens and units actuators with the link, but the connection is not yet cut through.

Relays A, B, C, S, U, 1, 2 and 3 are operated when party digit 1 is dialled incident to setting up a local call. After pulsing stops, relay C releases and closes a circuit for relay E from ground over contact Kb5, conductor 244, contact Cb12, contact 1 of relay 2 in operated position, conductor 242, contacts Sm7, Um15, Tb15, conductor 246, lower winding of relay E, to terminal TC and the connector contacts to the test wire T of the called line. Unless the line is busy, relay E finds battery on this test wire and operates.

Relay E locks from battery over its upper winding, conductor 245, contact Lb4, conductor 233, contact Em4, conductor 231, and then by way of contacts Lb18, Bm4, conductors 282 and 244 to ground on contact Kb5. Relay E cuts the line through to the connector switch at contacts Em17 and Em14; places ground from contact Kb5 over contact Bm14, conductor 238 and contact Em11 on test wire T of the called line to operate its cutoff relay; prevents application of busy tone at contact Eb14; prevents subsequent operation of relay C to make further dialling ineffective at contact Eb4; and at contact Em1 it prepares a circuit for relay F.

Relay S then releases following relay C, closing a circuit for relay F from battery through resistance 285, contact 2m4, upper winding of F, conductor 248, contact Sb15, conductor 247, contacts Em1, Fb12 and 4b7 to the ringing start conductor RS1, lower right hand portion of Fig. 17.

Relays A, B, E, U, 1, 2, 3 are operated incident to ringing. The battery on the conductor RS1, connected in the circuit just traced, starts the ringing interrupter (Fig. 12) if not already running from another call. At the start of the next ringing period the interrupter applies a ground pulse to conductor RS1, causing relay F to operate. This relay, upon actuation, transfers its circuit over contact Fm12 to ground on the ringing hold conductor RH and connects ringing current to the called line from the ringing generator conductor RG1 (top of Fig. 17) over contacts 3m18, 6b18, 5b7, 4b15, Fm4, Em17, through the connector and plus line conductor and back over the minus line conductor, connector contacts, then contacts Em14, Fm7, 4b18 and resistance 300 in parallel with the upper winding of relay S to ground. The parallel circuit of the upper winding of relay S, with the resistance 300, extends over conductor 224. This rings the bell at the called station. A small amount of ringing current is returned through the condenser which bridges from conductor 228 to the break side of contact Fb7, shown in Fig. 17, as a ring-back tone to the calling line. Using part of the actual ringing current rather than a separate ring-back tone permits checking the ringing frequencies of codes from a distant office.

At the end of the ringing period, the interrupter opens ground on ringing hold conductor RH, causing relay F to release. These functions are repeated in successive ringing periods.

The counting relays operated by dialling the party digit select one of the five ringing generator leads RG1 to RG9—RG1 for parties 1 and 2, RG3 for parties 3 and 4, etc. On party digits 1, 4, 5, 8, 9 relay 4 is not operated, so that ringing current is sent out over the plus line and ringing is started over conductor RS1; party digits 2, 3, 6, 7 and 0, with relay 4 operated, ring out on the minus line and start ringing over conductor RS2. This makes it possible to use either bridged metallic or divided grounded ringing on any line. Two separate start conductors RS1 and RS2 are provided for code ringing up to ten codes; when this is not needed, the two conductors are connected together in the interrupter.

If the called party answers during the ringing period, with relay F operated, relay S operates over the ringing circuit described above and releases relay F at contact Sb15. With relay F released, battery is fed to the called line over the lower winding of relay D, conductor 229, contact Fb7, Em14, —C line connector contacts, minus branch of the line and back over the plus branch, connector contacts, plus-C line branch in the link, contacts Em17, Fb4, conductor 222, through the upper winding of relay D and to ground, causing relay D to operate. Relay D releases the counting relays at contact Db5 and reverses the battery on the calling line for supervision on trunks and pay station lines.

If the called party answers during the silent period, with F released, relay D operates over the line loop, as described above, and performs the same functions.

The talking circuit is now closed through the two capacitors 292 and 305 in the link line branches 222, 229 which join the finder to the connector.

If the called party hangs up first, relay D releases, reversing battery on the calling line back to normal.

If the calling party hangs up first, relay A is released, which in a short while causes release of relay B. Release of relay B opens the circuits of the finder and connector coils and of relays E and U at Bm4 and Bm14, restoring the link to normal. If the called party has not hung up before, it will go on lockout when ground is removed from its test wire T by the release of the link.

It will now be assumed that the called line is busy. In this case relay C releases after the party digit and connects relay E to the test wire T of the called line, as described before. Relay E does not operate, however, because the test wire T is either grounded by another link or there is no battery on it, if the called line is on lockout. With relays C and E remaining unoperated, busy tone is applied to the calling line from conductor BT (upper left corner, Fig. 17) over contact Cb15, conductor 220, contact Lb7, resistance 306, contact Um2, conductor 227, contacts Eb14 and Fb7, link branch 229 and condenser 292. When relay S releases, following relay C, relay E is disconnected from the test wire T of the called line by contact Sm7 to prevent later operation of relay E, should the called line become free before the calling party hangs up. Counting relays 1–6 remaining operated keep the circuit of relay C open so that further dial pulses, if received, will have no effect.

When the calling party hangs up, relay A releases followed by B and ground is applied briefly to the test wire T of the called line from contact Kb5, conductor 244, contact Cb12, contacts 2m1, 4m1, 6m1 in parallel, conductor 242, contact Sb7, conductor 243, conductor 238, contact Bb14 and conductor 239 to the test wire T so as to test for reverting call. On normal calls this has no effect, and the release of relay B restores the link to normal.

On a reverting call to a station on the same line, the test wires T of calling and called lines are the same so that the line tests busy. When relay A releases, followed by the release of relay B, after the calling party hangs up, the reverting call test ground applied to the test wire of the called line by the release of relay B, as described above, returns over the test wire to the finder from ground on contact K*b*5, conductor 244, contact C*b*12 and contacts 2*m*1, 4*m*1, 6*m*1 in parallel, conductor 242, contact S*b*7, conductor 243, and conductor 238 to contact B*b*14, conductor 239 over the test wire T to the finder terminal TF. This ground takes the place of the ground through contacts K*b*5 and B*m*4 and holds the connector switch operated while the finder switch is held by ground over contacts K*b*5, C*b*12, contact 2*m*1, 4*m*1, 6*m*1 in parallel to contact S*b*7 in place of K*b*5 and B*m*14. With relay B released, ground on the finder terminal TF operates relay E over contacts B*b*4, L*b*4, conductor 245 and upper winding of relay E to battery. Relay E cuts through to the called line and starts the ringing, as described previously. The line conductors plus-F and minus-F of the finder are opened at contacts B*m*1 and B*m*11, to prevent ringing-back over the finder switch into the relays E and D.

When the ring is answered, relay D operates as described before, releasing counting relays 1–6. This opens the ground circuit to test wire T over which the link is holding, due to opening of the counting relay contacts 2*m*1, 4*m*1 and 6*m*1, thereby releasing the entire link and putting the called line on lockout. Talking battery is then supplied to the two parties on the line over the lockout circuit of the line, as previously described in connection with Fig. 9.

Next will be described the selection of a trunk terminated on a line, assuming a trunk group which is reached by dialling "0." For other trunk digits the operations are similar.

When relay C releases after "0" is dialled, relays G and H operate, seize the marker and identify the selection to be made over conductors EV, TK and P9. In response, unless all trunks in the called group are busy, the marker applies ground to conductors AC and LD, to allotter multiple bar 10 and through shift relays in the trunks to an allotter units bar corresponding to the tens and units digits of the first idle trunk. This operates allotter magnet AR and the connector tens and units magnets required to select the trunk. It may be assumed, for the sake of convenience, that lines 11, 12, etc. are assigned for trunk group "0."

Ground from the marker over conductor LD operates relay L over contact G*m*15 and upper winding of relay L to battery. Operation of relay L cuts the calling line through the link directly to the selected trunk from finder terminals plus-F and minus-F over contacts L*m*12 and L*m*15, conductors 223 and 230 to link terminals plus-C and minus-C at the connector side. This operates relays in the trunk over the calling line, and these relays apply ground to the test wire of the trunk.

The release of relay C is followed by that of relays S, G, H, 3, 4, 6 releasing the allotter AR and the marker. The connector switch tens and units magnets then lock over the terminal LKC and conductor 240 and upper winding of relay U which operates. Relay L disconnects relay A at contacts L*b*12 and L*b*15; relay A in turn releases relay B after the connector switch tens and units magnets are held over the LKC terminal, conductor 240, relay U, to ground at contact L*m*18. The finder switch tens and units magnets hold from ground on test wire T of the called trunk, conductor 239, contact B*b*14, and relay L holds over contact B*b*14, conductor 306, contact L*m*1 and lower winding of relay L to battery. In addition, relay L opens the busy tone circuit at L*b*7 to prevent unnecessary starting of the busy interrupter and the circuit of relay E at L*b*4 to prevent its operation after relay B is released. The result is that on trunk calls only relays L and U stay operated.

The release of the trunk may be controlled by the calling party or by the operator. In either case release of the trunk removes ground from trunk test wire T, thereby releasing the finder switch and relay L, which in turn releases the connector switch and relay U. This restores the link to normal.

Next will be described the selection of a trunk terminated on a trunk switch. It will be assumed that the trunk group is reached by dialling "0"; for other trunk digits the functions are similar.

When relay C releases after "0" is dialled, relays G and H operate, seize the marker and identify the selection to be made over conductors EV, TK and P9. Unless all trunks in the called group are busy, the marker responds by connecting ground coming from the trunk circuits to the conductors AF and LD. Ground on AF operates the allotter magnet AR of the finder switch which connects the finder tens and units magnets 54 and 85 to the allotter bank multiple. This connects ground to the allotter bars corresponding to the tens an units digits of the calling line over the holding circuits of the operated tens and units coils in the finder. The resistance 283 in this holding circuit is bridged by contact H*m*4 during selection, to provide a direct ground.

At the same time the marker causes the allotter magnet of an idle trunk switch to operate. The ground on the two allotter bars is thereby connected to the tens and units magnets in the trunk switch which corresponds to the calling line. These magnets operate, connecting the trunk to the calling line which then holds the trunk switch.

In the meantime, ground placed by the marker on conductor LD has operated relay L over contact G*m*15 to ground on the upper winding of relay L. This relay, upon operating, disconnects relay A at contacts L*b*12 and L*b*15; relay A in turn releases relay B by opening its contact A*b*1 and B lets the calling link restore by opening contacts B*m*4 and B*m*14. This disengages the marker. Since no selection has been made in the connector switch of the link, relay L finds no holding ground on connector test wire T and releases after the marker has returned to normal. The link is now free, and the trunk call is completed over the trunk switch.

In case all trunks in a called group are busy, the functions are the same for trunks terminated on lines or on trunk switches. In either case the marker is directed by the shift relays in the trunks to apply ground to conductor AC and to allotter multiple bar 10. This operates the tens magnet 10, but no units magnet in the connector switch, and leaves relay L unoperated. After the marker is disengaged, the tens magnet locks through relay U in a circuit relay already described and busy tone is applied to the line. Since T does not operate, the counting relays which are actuated hold over the locking path described in connection with the explanations referring to the dialling of units digit 1 on local calls, keeping relay C from operating so that further dialling by the calling party will have no effect. When the calling party hangs up, relays A, B, U and counting relays 1–6 and the finder and connector tens and units magnets release, restoring the link to normal. The dialling of unassigned prefix numerals causes the marker to perform the operations described above in connection with the explanations referring to all trunks' busy condition, thereby returning busy tone to the calling party.

Unless a local call is answered within a certain time interval, the link will be released and the calling line will be placed on lookout by the lockout timing circuit described in connection with Fig. 14. So long as the link is engaged, either relay B or relay U is held operated, connecting battery over resistance 280, either over contact B*m*7 or U*m*12 and lower winding of relay K to the lockout start conductor LS. Ground pulses are transmitted over this lead, as previously described, at intervals of three minutes. The first ground pulse after relay K is connected to conductor LS operates relay K which locks over its contact Km2 and contacts Tb12 and Sm12 to ground on conductor 293 before any digit is dialled. After the prefix digit, relay K locks over its contact Km2 and contact Tm12 in parallel with relay T and releases together with T after the units digit. From then on, relay K can lock over contacts Km2 and Sm12 until relay S releases after the party digit, when a new locking path is closed over contacts Km2, Tb12, Db5, Tb7, conductor 232, contact Cb4, conductor 231, contacts Lb18, Bm4, and conductors 282, 244 to ground on contact Kb5. When the call is answered, contact Db5 opens this locking path. After the called party hangs up, relay D releases and again permits relay K to lock.

This means that relay K can lock at any time during the progress of a call, except while the call is being answered. If operated at the time, relay K is released with T after the units digit, to re-start a timing interval just before ringing is started.

If relay K, after being operated by pulse on conductor LS, locks and remains operated, ground through its contact Kb5 is opened but the link holds over ground on lockout trip conductor LT until this ground is interrupted by the lockout timing circuit three minutes later. This releases the link and places the line on lockout.

On calls to trunks lockout is prevented by contact Lb18 opening the locking path of relay K.

It will be recalled that the system also provides for a time disconnect feature on local calls. When the call is answered, relay D operates and releases relay K, if operated, for lockout timing at the time. This connects relay T over contacts Kb15 and Dm15 to time disconnect conductor TD. Ground pulses are transmitted over this conductor at intervals of three minutes immediately after the pulses on conductor LS. The next pulse after the call is answered operates relay T which locks over contact TM7, conductor 232, contact Cb4, conductor 231 and to ground at contact Kb5 over the circuit including contacts Lb18 and Bm4. Three minutes later the next pulse on conductor LS operates relay K which now locks over contacts Km2 and Tm12, conductor 241, conductor 249 through lower winding of relay T to battery. With relay K remaining locked, the link is released three minutes later, as described in connection with the lockout feature discussed before. The subscriber thus is given not less than six minutes for each call.

With relays E, K and T operated, the lower winding of relay S is connected over conductor 225, contact Em7, conductor 226, contact Km12 and contact Tm18, conductor 221 to the dial tone conductor DT over which a ground pulse is transmitted twenty seconds, and again a few seconds before each three-minute pulse. These pulses on conductor DT operate relay S for approximately one second. Relay S applies busy tone to the line over contact Lb7, resistance 306, contact Um2, contact Sm4 as a disconnect warning tone.

Time disconnect is not effective on trunk calls, as explained before.

The links are taken into use in rotation. After all links have been engaged, the units guard applies ground to conductor RS (lower left corner, Fig. 16), operating relay X in all links which are idle at that time over its contact Xb2, lower winding of X and BS—SW switch, then over contacts Bb7 and Ub12, resistance 280 to battery. After the links are seized by calls, their relays X release and cannot operate again until all links have been seized one after the other. In a 200-line board, each 100-line group resets the idle links in both boards, as explained in the units guard description, so that each group seizes links in the other group only when its own links are busy.

Each link has its own fuse. If this fuse blows, relay X releases or, if released, cannot operate again, making the link busy until the fuse is replaced. Any link may be made busy by its busy switch BY—SW which is a manually operated switch and is normally closed, but when opened it opens the circuit of X.

Certain relay windings are shunted by resistors for spark protection. Other circuits are protected by condensers in series with resistors, where necessary.

Shorting clips inserted on the jacks for the link relay unit connect jack springs C11 to C12 and S11 to S12 (lower left corner, Fig. 16) when the link position is vacant. These clips automatically carry the circuits past the link position when a link relay unit is taken out.

Test jack S (Fig. 16, upper left corner) is used for dialling local calls. For dialling trunks, test jack C must be used and relay A must be operated by hand to land on the link.

There are several novel features included in the C. A. X. link, for example, (1) the use of relays F, K, S and T each for performing plural functions, namely, relay F operating after a prefix digit to switch the selection from the first to the second hundred and its use after the units digit to start ringing; relay K operating on timing pulses after the link is seized for lockout timing and after a call is answered for disconnect timing; relay S coacting with relay C to allow time for selections, to trip the ring during the ringing period, and also operating after a call is answered to apply disconnect warning tone; and relay T operating after the prefix digit to switch to tens selection, releasing after the units digit to switch to party selection, and operating again for disconnect timing; (2) the provision of a counting relay circuit comprising six relays arranged for binary operation in pairs of two to count ten pulses; (3) the use of the counting relays for counting dial digit pulses to furnish information to the marker and the use of some of the counting relays in party line ringing; and (4) the provision of five ringing leads for ten rings in conjunction with two ring pickup leads.

Changes may be made within the scope and spirit of the following claims.

I claim:

1. In a telephone system, a subscribers' line circuit comprising a line relay and a cutoff relay, circuit means for energizing said line relay over the line loop upon initiation of a call by a subscriber, test circuit means for thereafter energizing said cutoff relay in a series circuit with said line relay which series circuit excludes said line loop, contact means respectively controlled by said line relay and said cutoff relay when said relays are energized in said series circuit for establishing an auxiliary circuit for said cutoff relay, said auxiliary circuit being operative to hold said cutoff relay momentarily operated upon opening of said test circuit means and consequent deenergization of said line relay, and circuit means including contacts controlled by said line relay and said cutoff relay for connecting said cutoff relay momentarily across said line loop after deenergization of said line relay.

2. The circuit arrangement defined in claim 1, wherein said cutoff relay comprises two balanced windings, said cutoff relay remaining connected across said loop on reverting call to feed transmitter battery to the line on said loop over said balanced windings.

3. In an automatic telephone system, subscribers' line circuits arranged in groups according to the tens digits of the associated lines, each line circuit having a line and a cutoff relay, a tens and a units guard circuit including tens and units guard relays corresponding respectively to the tens and units digits of the lines in a group, a circuit controlled directly by contacts of the line and cutoff relays of any line circuit in any subscriber's tens group upon actuation of said line and cutoff relays associated with a calling line for governing the operation of said guard relays, finder switches, and selection control means governed by said guard relays for causing an idle finder switch to establish connection with the calling line.

4. The circuit arrangement defined in claim 3, comprising an allotter device associated with each finder switch, and tens and units actuating means governed by said allotter device under control of said guard relays to effect selection of the calling line.

5. In an automatic telephone system having switching apparatus comprising a plurality of finder and connector switches, sets of conductors associated with subscribers' lines arranged in each of said switches in tens and units groups, an allotter device in each of said switches comprising ten allotter contacts for each tens group and ten allotter contacts for each units group, common tens and units guard circuits for aiding in selection of calling lines, means in said guard circuits responsive to the initiation of a call by a subscriber and directly controlled by the calling subscriber's line circuit for placing potentials on the tens and units allotter contacts corresponding to the calling subscriber's line, means for thereafter operating the allotter device of an idle finder switch to cause such switch to establish connection with said calling line, a link circuit individual to and permanently associated with said finder switch, means in said link circuit for receiving dial pulses from the calling line, and a connector permanently associated with and individual to said link circuit for thereafter establishing connection with the called line designated by said dial pulses.

6. The circuit arrangement defined in claim 5, together with means for freeing said allotter contacts if marked responsive to initiation of a call by a faulty line.

7. The system and circuit arrangement defined in claim 5, comprising a common marker device, means in said link circuit for operating said marker device to effect connection of marking potentials to certain of said allotter conductors which correspond to the called line designated by said dial pulses, and means operated by said link circuit for thereafter causing said connector to establish connection with the called line.

8. In an automatic telephone system, a plurality of finder switches each associated with a link circuit, an allotter device in each finder switch which is individual thereto and comprises an allotter magnet, a control circuit including a conductor serially connected with all link circuits, means for marking said conductor in response to a call initiated by a subscriber, means operative in an idle link responsive to such marking for operating the allotter magnet associated with the finder of such idle link, and means operated by said allotter magnet to cause said finder to seize the terminals of the calling line.

9. In an automatic telephone system, subscribers' lines, link circuits for completing connections between calling and called lines, common tens and units guard means for aiding in connecting a calling line with an idle link, allotter means for coaction with said tens and units guard means in connecting an idle link circuit with a calling line, each line having a line and a cutoff relay, circuit means directly controlled by said line and cutoff relays for releasing the tens and units guard means after the corresponding calling line is connected with an idle link, and means effective in case of failure of the cutoff relay of a calling line to release said guard circuits for disabling said tens and units guard means to avoid landing of other calls for the duration of failure of the cutoff relay of such calling line.

10. An automatic telephone system comprising a plurality of pairs of identical switches each pair constituting a finder and a connector, respectively, a plurality of sets of removable conductor bars extending serially through said pairs of switches constituting a line bank and an allotter bank multiple therefor, each switch having tens magnets and units magnets for effecting connection with sets of conductor bars representing terminals of subscribers' lines, each switch also having an allotter magnet for connecting said tens and units magnets thereof with predetermined conductor bars in said allotter bank multiple, a link circuit individual to a pair of finder-connector switches and permanently connected therewith, and means in said link circuit for controlling the operation of the allotter magnets in the finder and connector switches associated therewith to effect operative actuation of tens and units magnets thereof in the setting-up connections between calling and called lines.

11. The system defined in claim 10, comprising common tens and units guard means to prevent simultaneous operation of more than one tens magnet and one units magnet, respectively, in said finder switch, and circuit means controlled directly by relay means individual to a calling line for governing the operation of said guard means.

12. The system defined in claim 10, comprising common tens and units guard means to prevent simultaneous operation of more than one tens magnet and one units magnet, respectively, in said finder switch, circuit means controlled directly by relay means individual to a calling line for governing the operation of said guard means, common marker means for determining the operation of tens and units magnets, respectively, in said connector, and circuit means in the link associated with said connector for controlling said marker means in accordance with dial pulses delivered thereto by a calling line.

13. In an automatic telephone system, a finder switch for establishing connection with the terminals of a calling line, a link circuit individual to said finder and permanently associated therewith, means operated by the finder incident to establishing connection with said calling line for connecting said line to said link circuit to condition it for receiving dial impulses from said calling line, a common marker circuit, circuit means operated by said link circuit for governing said marker circuit to condition the called line for selection, means in said marker circuit for thereafter controlling said link circuit to mark a test conductor associated with the called line, a connector individual to said link circuit and permanently associated therewith, and means responsive to the marking of the test conductor of the called line by said marker circuit for causing said connector to extend said link to the called line.

14. In an automatic telephone system, switching means including finder-connector switches and link circuits cooperating therewith for establishing connections between calling and called lines, a set of lockout relays, timing means for delivering timing impulses to said lockout relays at predetermined time intervals, contact means operated by said lockout relays for delivering signal impulses to said links to cause a link in use in a connection between a calling and a called line to release such connection if the call is not answered within a predetermined interval and to place the calling line on lockout, and means operative upon power failure which disables said timing means for generating timing impulses to continue operation of said lockout relays at shortened time intervals.

15. In an automatic telephone system, a first hundreds and a second hundreds group of subscribers' lines, a link circuit for setting up connections between calling and called lines, means in said link circuit for receiving dial pulses delivered thereto by a calling line, and a multipurpose relay in each link circuit, means controlled by said multi-purpose relay in response to delivery to said link of dial pulses denoting a certain prefix digit for switching the selection from the first to the second hundreds group and means also controlled by said multipurpose relay after delivery to the link of a party digit to start ringing on the called line.

16. In an automatic telephone system, a link circuit for setting up connections between calling and called lines, means for delivering lockout timing pulses to said link to effect disconnection thereof, when taken into use by a calling line and place the calling line on lockout if the called line does not answer within a predetermined time interval, means for delivering timing pulses to said link to disconnect a call established thereover within a predetermined time interval, and a multi-purpose control relay in said link, circuit means governed by said control relay for controlling said lockout timing responsive to the seizure of the associated link, and means also governed by said control relay after a call is answered for controlling the disconnect timing of such call.

17. In an automatic telephone system, a link circuit for setting up connections between calling and called lines, relay means in said link responsive to delivery of pulses thereto for controlling selections, including a first relay which releases after each digit to initiate selection, and a multi-purpose control relay in said link, circuit means for operating said control relay after said first relay to allow time for selection operations, means also governed by said control relay for tripping the ring during a ringing period incident to ringing the called line, means for operating said control relay after the call is answered by the called party to apply disconnect warning signal to the parties engaged in the call, and means for thereafter effecting disconnection of the call.

18. In an automatic telephone system, a link circuit for setting up connections between calling and called lines, relay means in said link circuit responsive to delivery of dial pulses thereto for controlling selections, and a multi-purpose control relay in said link circuit, means for operating said control relay after delivery of a certain prefix digit to said link to condition the link for carrying out the tens selection, means controlled by said control relay after delivery of the units digit to condition the link for party selection, and circuit means also controlled by said control relay for releasing a connection after the lapse of a predetermined time interval.

19. In an automatic telephone system, a link circuit for establishing connections between calling and called lines, relay means operative in said link circuit responsive to dial impulses delivered thereto to initiate selections, a set of six counting relays arranged for binary operation in pairs of two for counting said dial pulses, said counting relays being arranged to furnish ten distinct relay combinations one for each of ten pulses delivered thereto.

20. The system and circuit arrangement defined in claim 19, comprising means controlled by some of said counting relays for controlling the transmission of ringing current to party lines.

21. In an automatic telephone system, finder connector switches, link circuit means cooperating with said switches for establishing connections between calling and called lines, code ringing means including five conductors and two ringing start conductors terminating in said link circuit means, and relay means in said link circuit means for controlling said code ringing means over said conductors to effect selective code ringing employing ten codes.

References Cited in the file of this patent

UNITED STATES PATENTS

| | | |
|---|---|---|
| 1,361,980 | Goodrum | Dec. 14, 1920 |
| 1,512,584 | Dunham | Oct. 12, 1924 |
| 1,750,934 | Lomax | Mar. 18, 1930 |
| 2,065,905 | Neely | Dec. 29, 1936 |
| 2,214,213 | Voss | Sept. 10, 1940 |
| 2,305,968 | Kiner | Dec. 22, 1942 |
| 2,307,757 | Boswau | Jan. 12, 1943 |
| 2,310,634 | Holden | Feb. 9, 1943 |
| 2,333,038 | Voss | Oct. 26, 1943 |
| 2,333,039 | Peterson | Oct. 26, 1943 |
| 2,396,077 | Blackhall | Mar. 5, 1946 |
| 2,489,539 | Powell | Nov. 29, 1949 |
| 2,568,101 | Voss | Sept. 18, 1951 |
| 2,639,331 | Ostline | May 19, 1953 |